US012651212B2

(12) United States Patent
Oliver et al.

(10) Patent No.: US 12,651,212 B2
(45) Date of Patent: Jun. 9, 2026

(54) SYSTEMS AND METHODS FOR SCHEDULING AND PERFORMING SELF-GUIDED TOURS OF MULTI-UNIT RESIDENTIAL FACILITIES

(71) Applicant: Tour24, Inc., Medfield, MA (US)

(72) Inventors: Georgianna Oliver, Medfield, MA (US); Michael R. Molt, Manhattan, KS (US); John I. Doyle, Washington, DC (US)

(73) Assignee: Tour24, Inc., Medfield, MA (US)

( * ) Notice: Subject to any disclaimer, the term of this patent is extended or adjusted under 35 U.S.C. 154(b) by 0 days.

(21) Appl. No.: 18/912,940

(22) Filed: Oct. 11, 2024

(65) Prior Publication Data

US 2025/0117716 A1 Apr. 10, 2025

Related U.S. Application Data

(63) Continuation of application No. 18/159,879, filed on Jan. 26, 2023, now Pat. No. 12,147,917, which is a
(Continued)

(51) Int. Cl.
*G06Q 10/02* (2012.01)
*G06Q 20/40* (2012.01)
(Continued)

(52) U.S. Cl.
CPC ......... *G06Q 10/02* (2013.01); *G06Q 20/4014* (2013.01); *G06Q 50/16* (2013.01); *G07C 9/20* (2020.01)

(58) Field of Classification Search
CPC .... G06Q 10/02; G06Q 20/4014; G06Q 50/16; G07C 9/20
See application file for complete search history.

(56) References Cited

U.S. PATENT DOCUMENTS 7,389,123 B2 6/2008 Rydgren et al.
9,754,433 B2 9/2017 Lagimodiere et al.
(Continued)

OTHER PUBLICATIONS

Ho et al., Smart locks: Lessons for securing commodity internet of things devices, Asia CCS '16: Proceedings of the 11th ACM on Asia Conference on Computer and Communications Security, pp. 461-471 (Year: 2016).*

(Continued)

*Primary Examiner* — Christopher Gomez
(74) *Attorney, Agent, or Firm* — Leydig, Voit & Mayer, Ltd.

(57) ABSTRACT

Systems, methods and software for scheduling and performing self-guided tours (SGTs) of multi-unit residential facilities (MURFs) are provided. For scheduling SGTs, the method includes receiving guest information, payment information, and identification (ID) information from a client device, determining validity of the payment and ID information, and receiving and confirming an SGT tour time. For performing SGTs, the method includes sending property access information to a client device, receiving a trigger from a property access control system indicating that a user of the client device has entered the MURF, providing MURF tour directions to the client device, and receiving tour data for the SGT. The disclosed systems, methods, and software provide prospective tenant users and owners and/or management of MURFs efficient and user-friendly interaction to accomplish and enhance their tour operation experiences.

20 Claims, 35 Drawing Sheets

Related U.S. Application Data continuation of application No. 16/518,772, filed on Jul. 22, 2019, now Pat. No. 11,593,718.

(60) Provisional application No. 62/701,100, filed on Jul. 20, 2018.

(51) Int. Cl.
   *G06Q 50/16*        (2012.01)
   *G07C 9/20*         (2020.01)

(56)         References Cited

U.S. PATENT DOCUMENTS

| | | | |
|---|---|---|---|
| 10,410,303 | B1 | 9/2019 | Catalano |
| 2006/0122850 | A1* | 6/2006 | Ward .................. G06Q 20/386 |
| | | | 705/64 |
| 2008/0162042 | A1 | 7/2008 | Huber et al. |
| 2010/0030590 | A1 | 2/2010 | Sodaro |
| 2010/0312670 | A1 | 12/2010 | Dempsey |
| 2014/0100905 | A1 | 4/2014 | Alexander et al. |
| 2017/0083961 | A1* | 3/2017 | Polston ............. G06Q 30/0625 |
| 2017/0140594 | A1 | 5/2017 | Zastrow et al. |
| 2018/0190056 | A1* | 7/2018 | Desinor, Jr. ........ G07C 9/00309 |
| 2018/0247473 | A1 | 8/2018 | Panchal et al. |
| 2018/0365914 | A1* | 12/2018 | Chiu ........................ G07C 9/20 |
| 2020/0342507 | A1 | 10/2020 | Hubbard et al. |
| 2021/0063164 | A1* | 3/2021 | Rezvani ................... G08G 5/32 |

OTHER PUBLICATIONS

Gimeno et al., "Combining traditional and indirect augmented reality for indoor crowded environments. A case study on the Casa Batlló museum," Computers & Graphics, 69: 92-103 (2017).

Lewis, "Airbnb Integration," RemoteLock, article downloaded from the Internet on Jul. 16, 2019, at https://support.remotelock.com/hc/en-us/articles/360001772751-Airbnb-Integration, 13 pp. (Mar. 14, 2018).

Opendoor, "How do I visit and Opendoor home?" article downloaded from the Internet on Jul. 22, 2019, at https://www.opendoor.com/w/faq/hot-to-visit-an-opendoor-home, 5 pp.

Pynwheel Touchscreens, "Self Tour," downloaded from Internet on Jul. 16, 2019, as https://pynwheeltouchscreens.com/Self-Tour, 3 pp.

Weiss, "This app aims to be the Uber of rental brokers," *New York Post*, article downloaded from the Internet at https://nypost.com/2017/10/03/this-app-aims-to-be-the-uber-of-rental-brokers/, 2 pp. (Oct. 3, 2017).

S. Alletto et al., "An Indoor Location-Aware System for an IoT-Based Smart Museum," Apr. 2016, in IEEE Internet of Things Journal, vol. 3, No. 2, pp. 244-253, Apr. 2016, doi: 10.1109/JIOT.2015.2506258 (Year: 2016).

U.S. Appl. No. 16/518,772, filed Jul. 22, 2019.

U.S. Appl. No. 18/159,879, filed Jan. 26, 2023.

* cited by examiner

602

Contact Info → Pre-Qualify → Schedule Tour → Tour Confirmation

Welcome to South Street Apartments!

Enter your drivers license and payment information. If you pre-qualify, you will be taken to the next screen to schedule your on-demand tour.

Drivers License
04BDJ58071

State
NH

Card number
4242 4242 4242 4242

Full name
GLENDA EATON

3

4

5

2

75

6

75

2

SYSTEMS AND METHODS FOR SCHEDULING AND PERFORMING SELF-GUIDED TOURS OF MULTI-UNIT RESIDENTIAL FACILITIES

CROSS REFERENCE TO RELATED APPLICATIONS

This application is a continuation of U.S. patent application Ser. No. 18/159,879, filed Jan. 26, 2023, which is a continuation of U.S. patent application Ser. No. 16/518,772, filed Jul. 22, 2019, which claims the benefit of and priority to U.S. Provisional Patent Application No. 62/701,100, filed Jul. 20, 2018, each of which is incorporated herein by reference in its entirety.

BACKGROUND

Apartment complexes provide tours usually during business hours. These tours normally involve leasing agents or representatives being available to show prospective renters around apartment units. Unfortunately, people who work during traditional leasing office hours or odd hours have a hard time touring apartments since a leasing agent should be present to provide entry and monitor prospective renters during tours. Leasing agents usually answer questions and provide additional information that prospective renters may have during a tour. So, if leasing agents do not work outside of traditional hours, properties miss lease opportunities. Additionally, smaller properties and properties with no on-site management at all are at a disadvantage.

SUMMARY

One aspect of the disclosure provides a method for scheduling a self-guided tour (SGT) of a multi-unit residential facility (MURF). The method includes receiving, at a tour server, guest information from a client device. The method includes receiving, at a tour server, payment information from a client device. The method includes determining, at the tour server, whether the payment information is valid. The method includes receiving, at the tour server, identification (ID) information from the client device. The method includes determining, at the tour server, whether the ID information is valid. The method includes receiving, at the tour server, a tour time for the SGT from the client device. The method includes providing, by the tour server, a confirmation including the tour time to the client device.

Another aspect of the disclosure provides a method for performing an SGT of a MURF. The method includes sending, by a tour server, property access information to a client device. The method includes receiving, by a tour server, a trigger from a property access control system indicating that a user of the client device has entered the MURF. The method includes providing, by the tour server, tour directions for the MURF to the client device. The method includes receiving, by the tour server, tour data for the SGT. The method includes sending, by the tour server, a confirmation to the client device after the SGT is completed.

Yet another aspect of the invention provides a system for performing an SGT of a MURF. The MURF includes a tour access control system positioned at an entrance thereof. The system includes a tour server. The tour server includes one or more processors in communication with one or more memory devices. The tour server is in communication with the tour access control system. The tour server is configured to: send property access information to a client device;

receive a trigger from the tour access control system indicating that a user of the client device has entered the MURF; provide tour directions for the MURF to the client device; receive tour data for the SGT; and send a confirmation to the client device after the SGT is completed.

DETAILED DESCRIPTION

Embodiments of the disclosure provide a system and method for scheduling and performing self-guided apartment tours. With the embodiments, individuals working at off-periods or unable to make scheduled tours performed with a leasing agent during normal business hours can still tour an apartment complex and/or unit. The embodiments will help reduce industry average response time of 39 hours, which indicates that it takes on average 39 hours between an individual expressing interest in an apartment unit to the individual being able to view the apartment unit. This slow response time may contribute to low service rate of the industry where 42% of leads receive no response at all and 40% of leads abandoning their search after 6 hours. With the embodiments, by cutting down industry response time and providing individuals with more flexibility, more people can view apartment units during their own time and not at an inflexible schedule of a leasing agent.

Embodiments of the disclosure provide systems and methods for sharing private sensor data. The embodiments address several obstacles, such as working within a secure ecosystem to manage sensitive information of potential tenants and controlling data streams. These provide the advantages of making apartment units available for viewing without compromising private network security where sensitive information reside.

Figure 1:
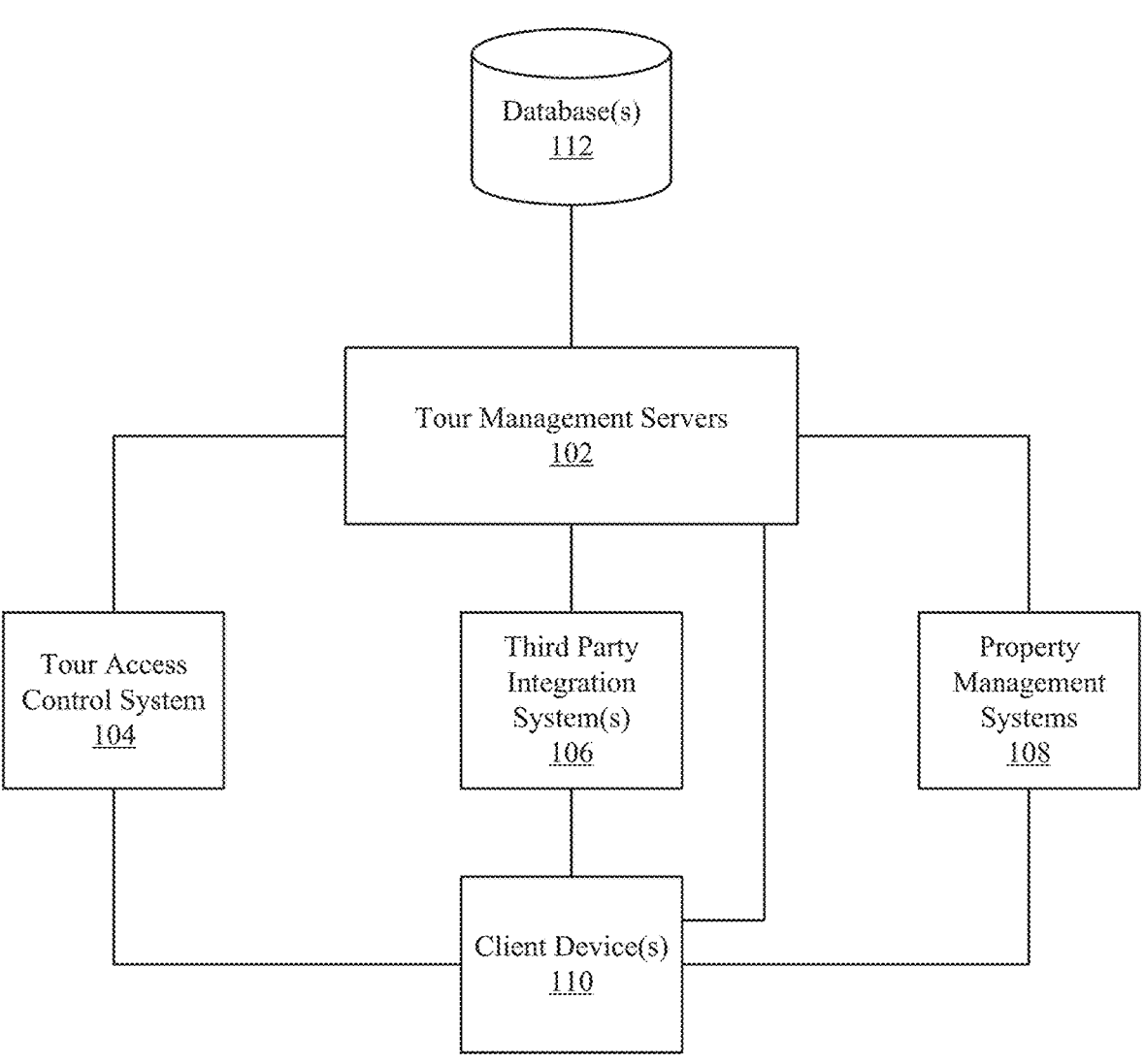
FIG. 1 illustrates a system for apartment touring according to an embodiment of the disclosure.

FIG. 1 illustrates a system for sharing sensor measurements according to an embodiment of the disclosure. The system includes tour management servers 102, tour access control system 104, one or more third party integration systems 106, property management systems 108, and one or more client devices 110. In some embodiments, the system includes one or more databases 112 for data storage by the tour management servers 102.

The client device(s) 110 are computing devices used by a prospect or individual interested in touring an apartment complex. For generality, the singular form will be used for the client device(s) 110, but the use of the singular form is not a limitation to one client device. Examples of computing devices for the client device 110 include mobile devices, for example, a smartphone, a tablet, a phablet, a smart watch, and so on. Computing devices may also include larger devices, for example, a laptop computer, a desktop computer, and so on.

The tour management servers 102 include one or more computing servers and devices for scheduling and performing apartment tours according to an embodiment of the disclosure. The tour management servers 102 connect the property management systems 108 to the third party integration systems 106 and/or to the tour access control system 104 so that a prospect using the client device 110 can schedule and perform a self-guided tour at certain properties.

The tour access control system 104 includes one or more devices for providing access to a property to be toured. The tour access control system 104 interfaces with the client device 110 to allow a prospect access to the property.

Third party integration systems 106 include one or more computing servers that provide services to the tour management servers 102. For example, third party integration systems 106 can be used for identity verification, payment method verification, monitoring location of prospects as they move from one location to another within a property, etc.

Property management systems 108 include one or more computing servers and/or devices owned by a property manager. The property manager may offer one or more services that can be adapted for use by the tour management servers 102. For example, an integrated calendar used by the property management systems 108 can be shared with the tour management servers 102 for tracking and/or limiting self-guided touring schedules.

Figure 2:
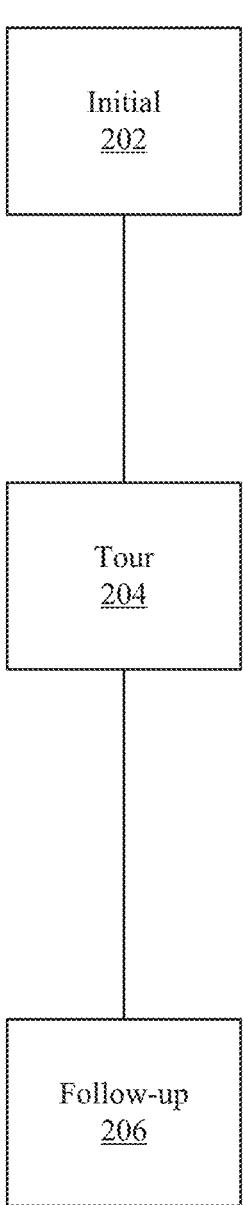
FIG. 2 is a flow diagram for scheduling and performing a tour according to an embodiment of the disclosure.

FIG. 2 is a flow diagram for scheduling and performing a tour according to an embodiment of the disclosure. Initial 202 indicates an initial flow where a prospect registers with the tour management servers 102 and picks a time for performing a self-guided or a lease-agent guided tour. Tour 204 indicates a process flow on how the tour management servers 102 and the various entities of FIG. 1 interact during a self-guided tour by the prospect. Follow-up 206 indicates a process of obtaining feedback from the prospect and/or a property manager.

Figure 3:
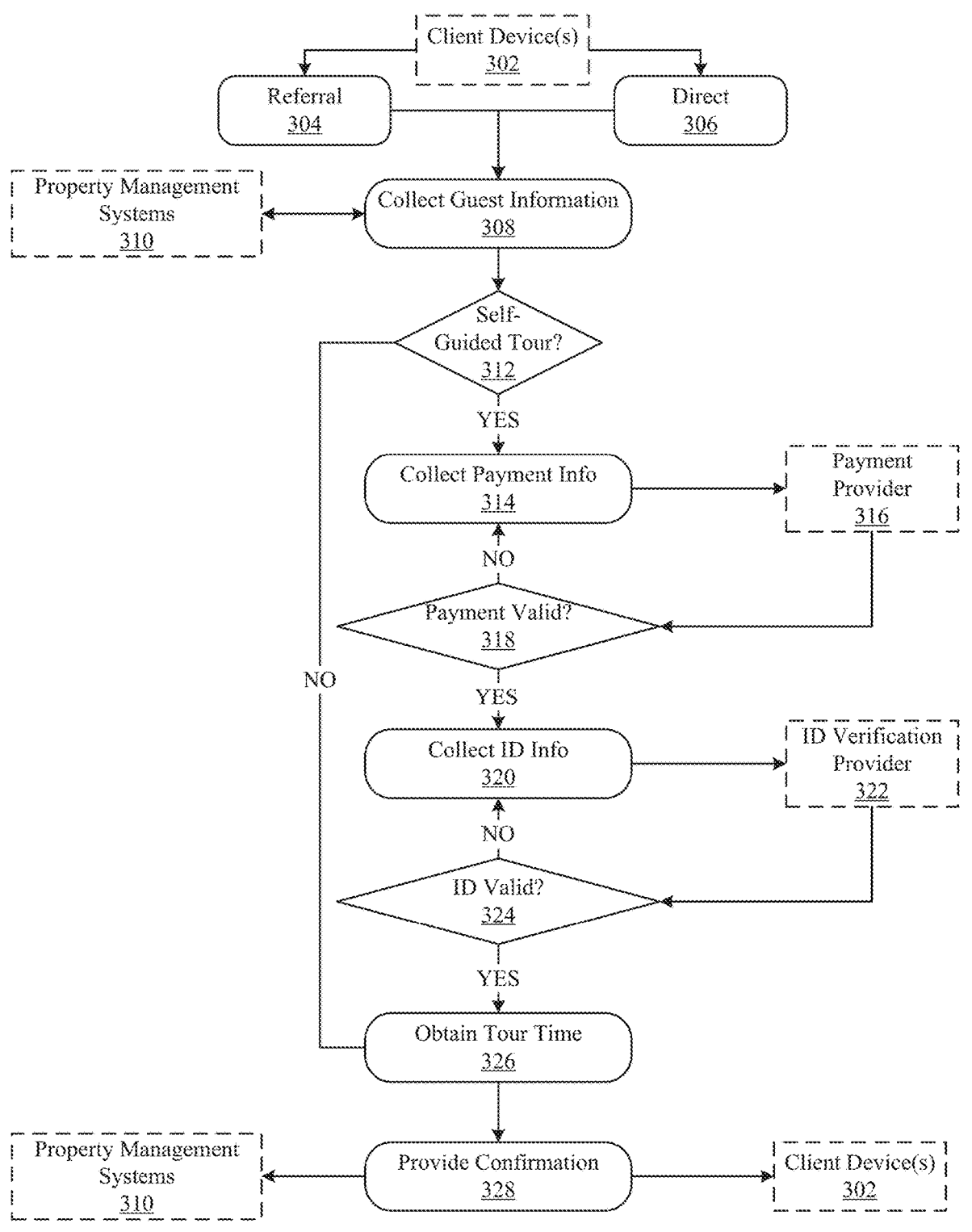
FIG. 3 is a flow diagram for scheduling a tour according to an embodiment of the disclosure.

FIG. 3 is a flow diagram for scheduling a tour according to an embodiment of the disclosure. FIG. 3 corresponds to the initial flow represented by initial 202 in FIG. 2. FIG. 3 illustrates steps taken by tour management servers in relation to other components, e.g., the client device 302, the property management systems 310, and third party integration systems such as payment provider 316 and ID verification provider 322.

At step 308, the tour management servers can collect guest information from the client device 302 either directly or indirectly. That is, the client device 302 can provide guest information to the tour management servers through a referral 304 or directly 306. A referral 304 includes third party websites or mobile platforms not hosted by the tour management servers. For example, these third party websites can include social media pages, web-search advertisement campaigns, property websites, internet listing service (ILS), etc. A direct 306 method of collecting guest information is through a website or mobile application that is hosted on the tour management servers.

The guest information collected at step 308 can be curated by the property management systems 310. That is, the property management systems 310 can provide configuration for which guest information to collect and/or which services, floorplans, apartment units, etc., are available. Guest information that may be collected include a guest's first and last name, email and phone number, contact preference, current address, desired move-in date, floorplan preference, referral information on how the guest came to know about the property, preference for self-guided tour, pet or type of pet, price range, desired lease length, etc. Once the tour management server collects the guest information from the client device 302, the tour management server can send the collected guest information to the property management systems 310.

At step 312, the tour management servers determine whether the user of the client device 302 wants a self-guided tour based on the guest information collected at step 308. If a self-guided tour is not selected, then the tour management server obtains tour times from the client device at step 302.

If a self-guided tour is selected, then at step 314, the tour management servers collect payment information from the client device 302. The payment information may include name on a credit or debit card, credit or debit card number, credit or debit card expiration date, and credit or debit card validation value (CVV) code. In some embodiments, the payment information may also include bank account and routing numbers. The tour management servers forward the obtained payment information to a payment provider 316 which verifies and stores the payment information. Payment information may be used by the tour management servers in conjunction with techniques for validation of user identity, as described in greater detail below. In some embodiments, collection of the payment information at step 314 for validation of user identity is not also used to collect an actual payment from the user by way of the payment information he or she provides at step 314.

At step 318, the tour management servers determine whether the payment information obtained at step 314 is valid. In an embodiment, the payment provider 316 provides a token to the tour management servers indicating the verification result. If the payment information is valid, the tour management servers associate the token with the guest in case charges are to be made in connection to services offered to the guest.

If the payment is valid, then the tour management servers obtain identification information for the guest at step 320, but if the payment is not valid, then the tour management servers reobtain the payment information at step 314. At step 320, a picture of the guest's identification card or passport is obtained and a current picture of the guest is obtained. The tour management servers provide this information to an ID verification provider 322 that then provides the tour management servers with an ID verification result.

At step 324, if the ID verification result is valid, then the tour management servers obtain tour time at step 326, but if the ID verification fails, then the tour management servers attempt to collect ID information at step 320.

At step 326, the tour management servers obtain tour times from the client device 302. In an embodiment, the available tour times can be separated into tour times for self-guided tours and tour times for leasing agent-guided tours. In an embodiment, only available times are shown and the available times are updated in real-time, with a configurational record stored in a relational database, e.g., database 112. The relational database can be updated by the property management systems 310 as timeslots for touring become available or unavailable. The tour management servers can query available tour times from calendars of the property management systems 310 and submit selected tour times to the calendars.

At step 328, the tour management systems 310 provide confirmations to the property management systems 310 and the client device 302. The confirmation to the property management systems 310 can include some of the guest information with the guest's selected tour time. The confirmation to the client device 302 can be a text or email that provides tour appointment details, e.g., directions to the property to be toured, a frequently asked questions for the property, and a frequently asked questions for self-guided tour procedures.

Figure 4:
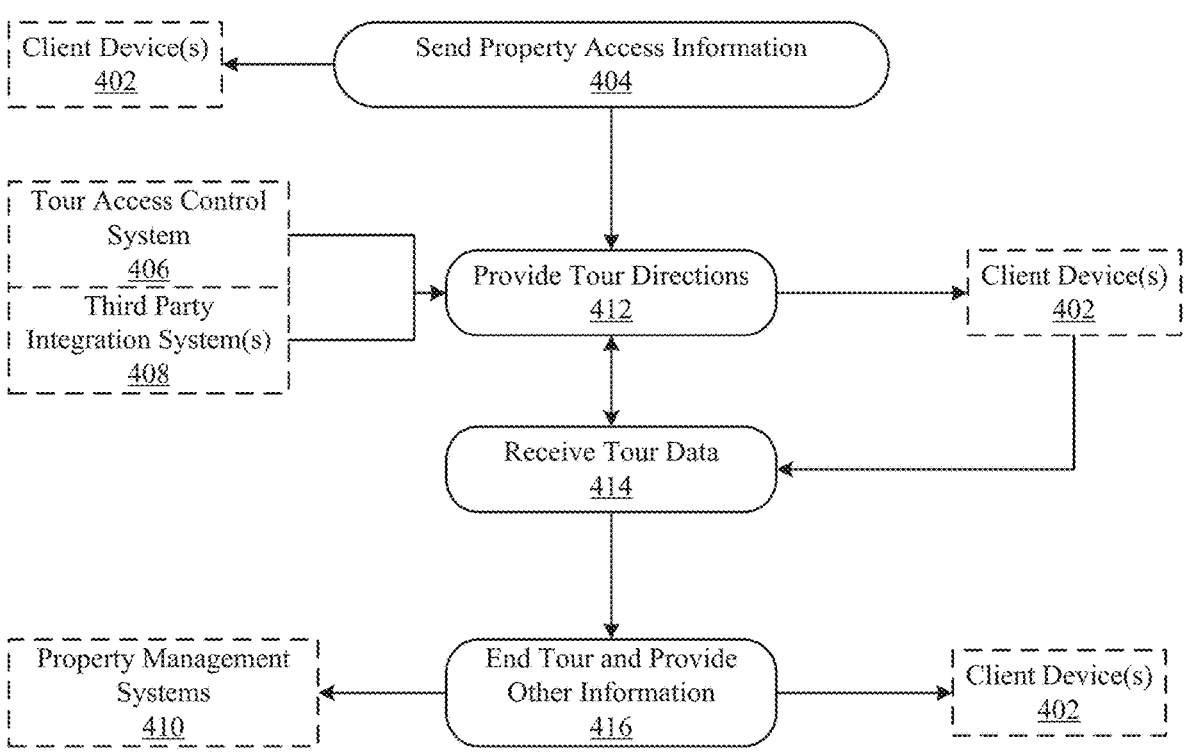
FIG. 4 is a flow diagram for performing a tour according to an embodiment of the disclosure.

FIG. 4 is a flow diagram for performing a tour according to an embodiment of the disclosure. FIG. 4 corresponds to steps represented by tour 204 in FIG. 2. At step 404, the tour management servers send property access information to the client device 402. The property access information can be sent to the client device 402 within a predetermined time before the self-guided tour. For example, the property access information can be sent to the client device 402 30 minutes prior to the scheduled time for the self-guided tour. The property access information can be sent to the prospect or guest via a preferred communication method indicated in guest information when the self-guided tour was scheduled. Examples of property access information include access codes for a keypad, a Quick Response (QR) code, a barcode, system credentials for accessing internet of things (IoT) devices, etc.

At step 412, the tour management servers provide the client device 402 with tour directions. Tour directions can be provided through a mobile application on the client device 402 where a tour path is highlighted and directions are provided to navigate the tour path. Additionally, tour directions can include one or more amenities associated with the unit being toured.

Provision of the tour directions to the client device 402 can be prompted by receiving an unlock verification from the tour access control system 406 or third party integration systems 408. For example, the client device 402 uses a barcode or QR code on the tour access control system 406 to unlock a door to the unit being toured. The tour access control system 406 then provides information about the code being used to unlock the door to the tour management servers. From that information, the tour management servers can pull information regarding the unit being toured and provide tour directions to the client device 402. In some embodiments, the tour directions are provided to the client device 402 based on a tour schedule.

At step 414, the tour management servers receive tour data from the client device 402. The tour management servers can also receive tour data from the property management systems 410 and/or third party integration systems 408. Tour data includes, e.g., a photograph or picture of the guest at the time of entry of the unit to be toured. Third party integration systems 408 can include security cameras, web cameras, etc., that provide the photograph of the guest to the tour management servers.

Tour data can also include location information from the client device 402 inquiring about amenities associated with the unit being toured. For example, the client device 402 can scan one or more wireless beacons, e.g., bluetooth beacons, to obtain information from the tour management servers regarding specific information indicated by a specific beacon. Tour data can include location of the client device 402 whereby the beacons interact with the client device 402 to provide approximate location of the client device 402 so that the tour management servers can use this information to determine a path that the guest took while touring the unit.

Tour data can include feedback information on specific amenities and features where the guest is able to provide through the client device 402 as he is touring the unit, whether an amenity meets his needs and/or wants. The feedback can be a rating from 0 to 5.

Interaction between steps 412 and 414 occur throughout the tour where tour data is obtained from the client device 402 prompting the tour management server to continue providing tour directions to the client device 402. At some point, the guest can end the tour through the mobile application running on the client device 402.

At step 416, once the tour is ended, the guest can be guided back to the entrance, presented with a thank you message, and asked to provide feedback on the guided tour, the unit that was toured, and any other information. If the guest is ready to lease, a property application is provided to the client device 402 by the tour management servers through email, short message service (SMS), etc., and if not, a follow-up process, e.g., follow-up 206, is performed. The tour management servers also provide the guest's feedback information to the property management systems 410 at step 416.

The follow-up 206 can include providing a survey to the guest to obtain more information. The survey can be sent to the guest to inquire how likely the guest would use the self-guided tour in the future or whether the guest will refer a friend. The survey can be sent to the guest through a social media prompt. The follow-up 206 can also include a survey sent to a leasing office of the unit that was toured. The survey can be sent to the leasing office to inquire how information received about the self-guided tour can be rated and the survey can also include various statistics on how many guests opted to use the self-guided tour. The follow-up 206 can also involve polling property management systems to determine whether any self-guided tour leads converted into leases.

The follow-up 206 can also include sending communication to the guest inquiring whether the guest has any questions. The communication may include the name of a leasing agent for the guest to contact. The communication may include a lease application or a link to the lease application. The communication involved in the follow-up 206 can be provided in time intervals. For example, asking for questions, introducing a leasing agent, and offering a lease application can be performed in the first 24 hours, and if the guest is still not decided on whether to sign a lease, then after 48 hours, more questions along the lines of whether the guest is looking elsewhere or whether the guest has made a decision can be sent.

Figure 5:
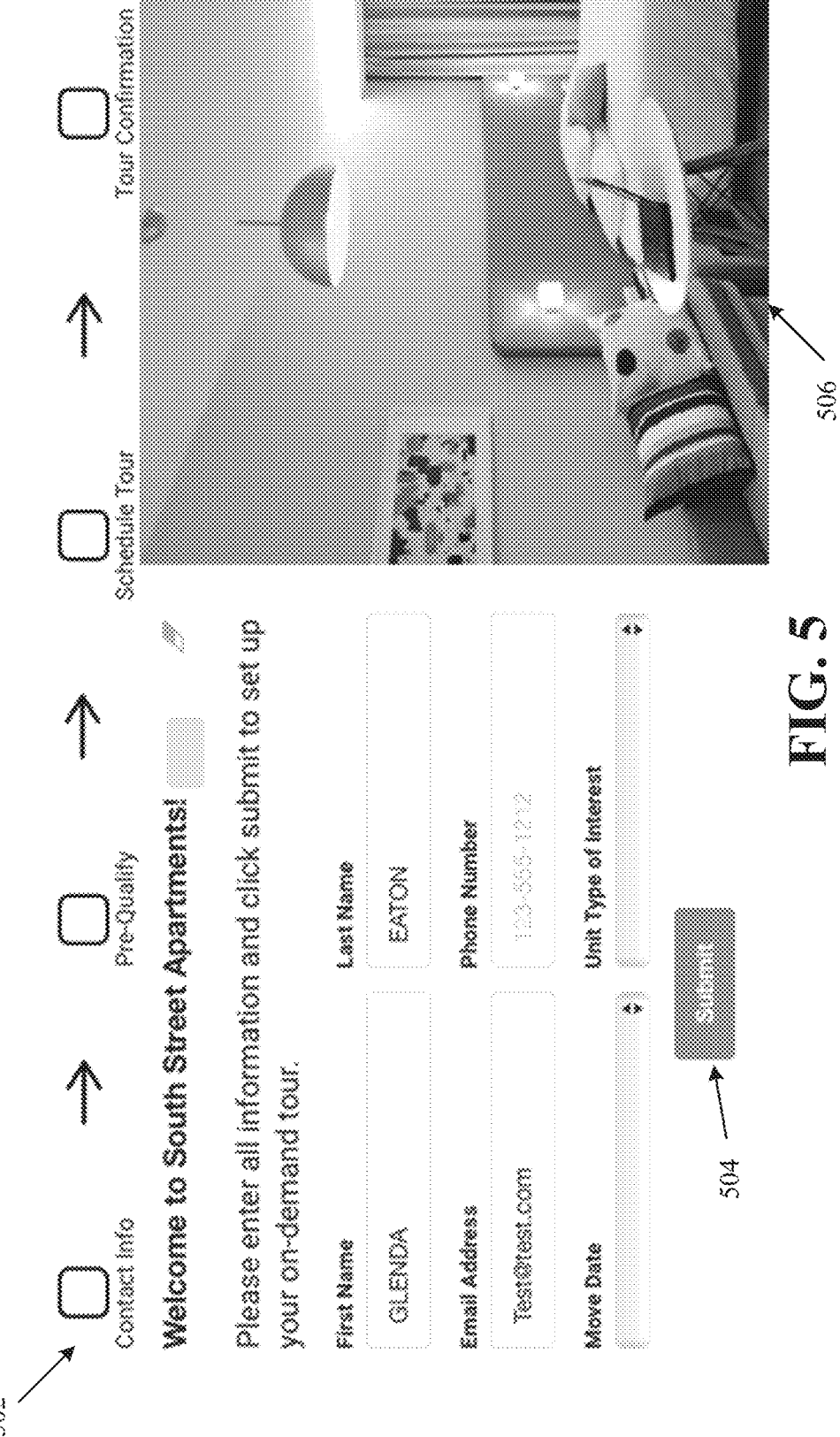
FIG. 5 illustrates an example flow for obtaining information according to an embodiment of the disclosure.

FIG. 5 illustrates an example flow for obtaining information according to an embodiment of the disclosure. Item 502 indicates a status bar that includes four steps: Contact info, Pre-qualify, Schedule Tour, and Tour confirmation. The page shown in FIG. 5 shows example guest information that can be collected on the Contact info page. These include first name, last name, email address, phone number, move date, and unit type of interest. A submit button 504 can be provided for submitting the guest information collected. A sample photo 506 can be provided as well.

Figure 6:
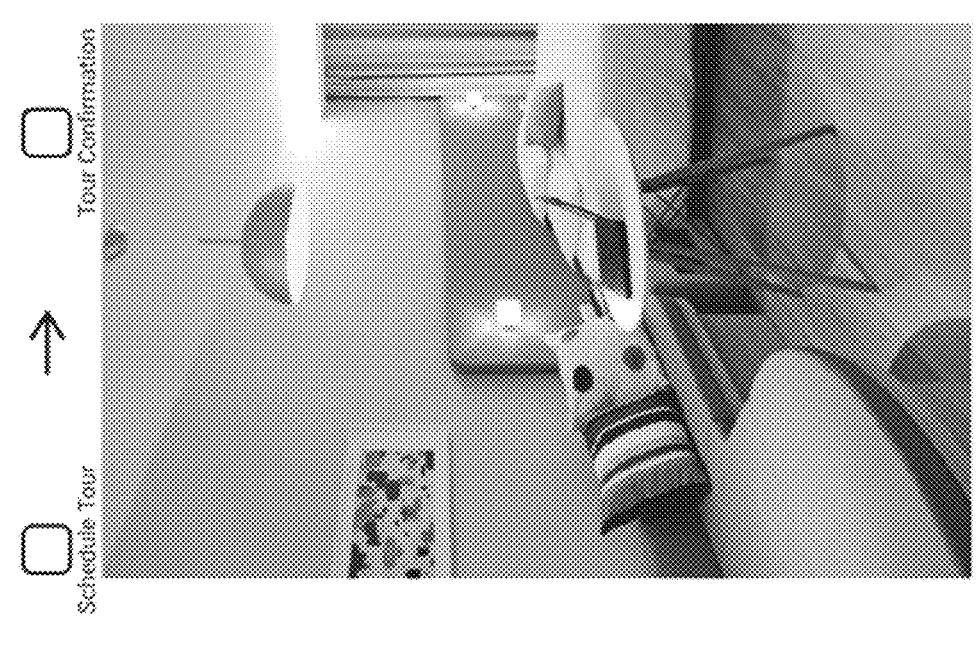
FIG. 6 illustrates an example flow for obtaining information according to an embodiment of the disclosure.
Figure 6:

FIG. 6 illustrates an example flow for obtaining information according to an embodiment of the disclosure. Once guest information has been obtained, a status of the Contact info can be indicated as complete with a check mark 602 on a next page. The page shown in FIG. 6 is used to obtain payment and ID information, e.g., driver's license and issuing state, card number, and full name printed on the card.

Figure 7:
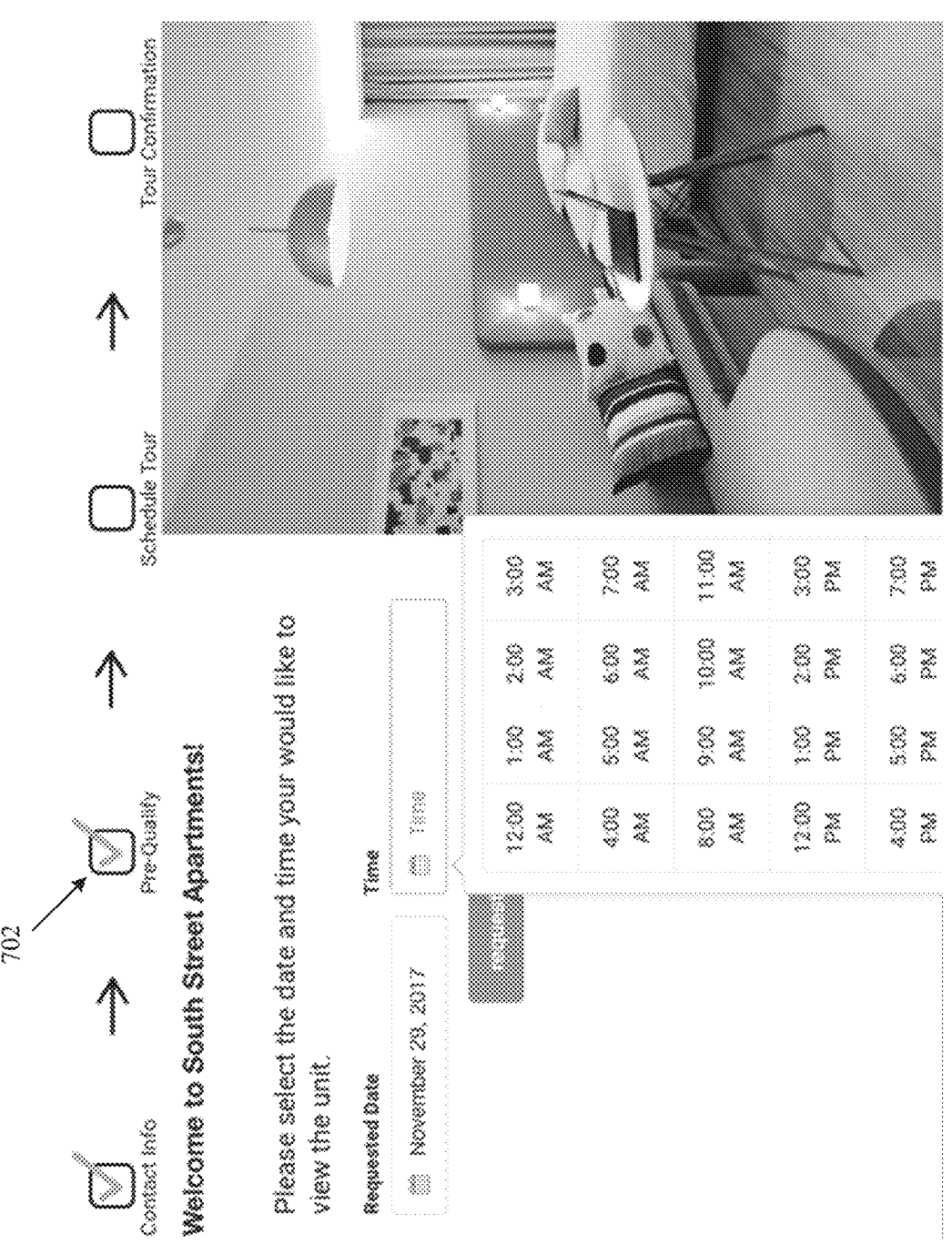
FIG. 7 illustrates an example flow for obtaining information according to an embodiment of the disclosure.

FIG. 7 illustrates an example flow for obtaining information according to an embodiment of the disclosure. In FIG. 7, once a guest passes the Pre-qualify stage, a check mark 702 appears on the Pre-qualify box and the guest is allowed to schedule a tour. FIG. 7 shows that the guest can choose a requested date and time.

Figure 8:
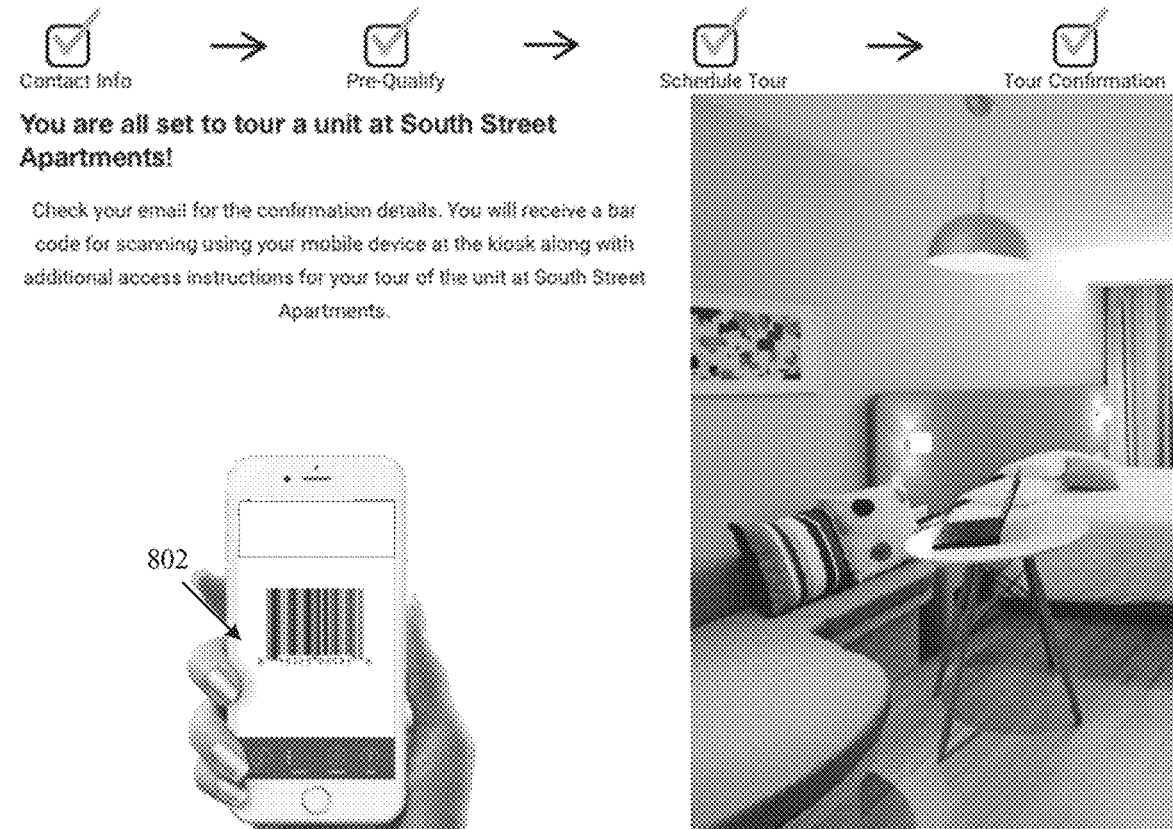
FIG. 8 illustrates an example flow for obtaining information according to an embodiment of the disclosure.

FIG. 8 illustrates an example flow for obtaining information according to an embodiment of the disclosure. After scheduling a tour, then a confirmation is provided to the guest. The confirmation can include a bar code 802 that is sent to the guest.

Figure 9A:
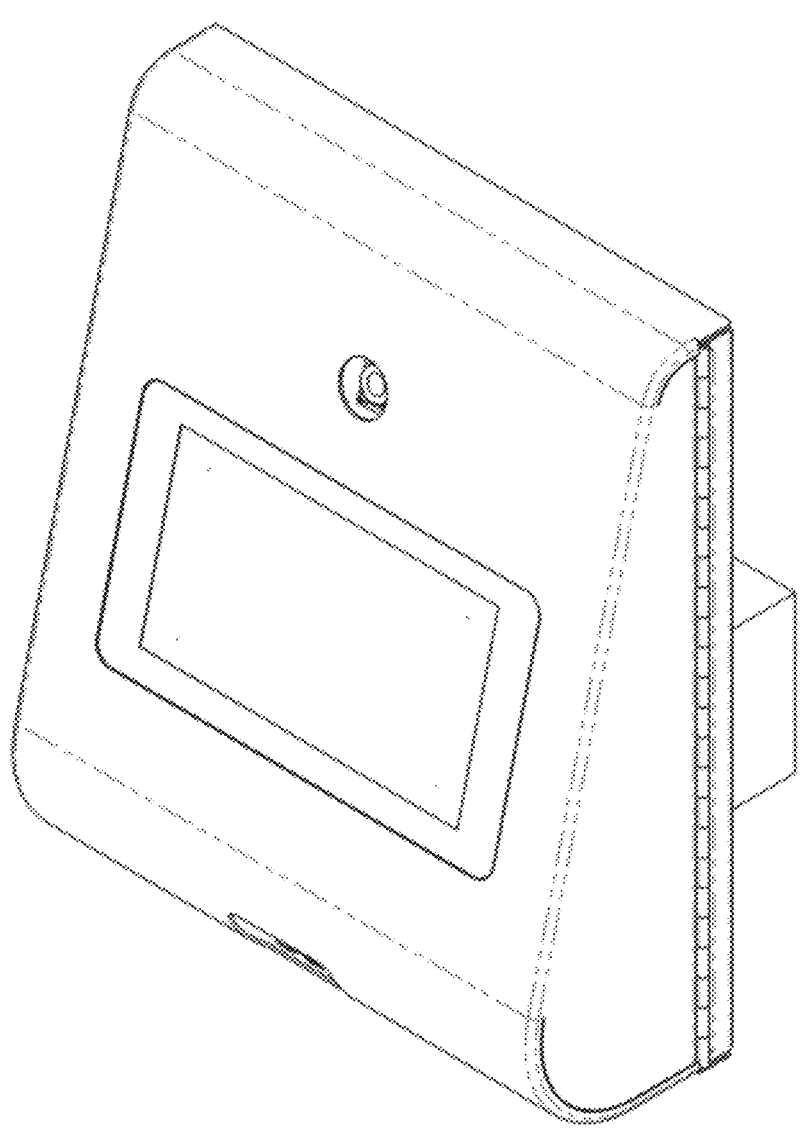
FIGS. 9A-9D illustrate several views of an example tour access control system according to an embodiment of the disclosure.
Figure 9B:
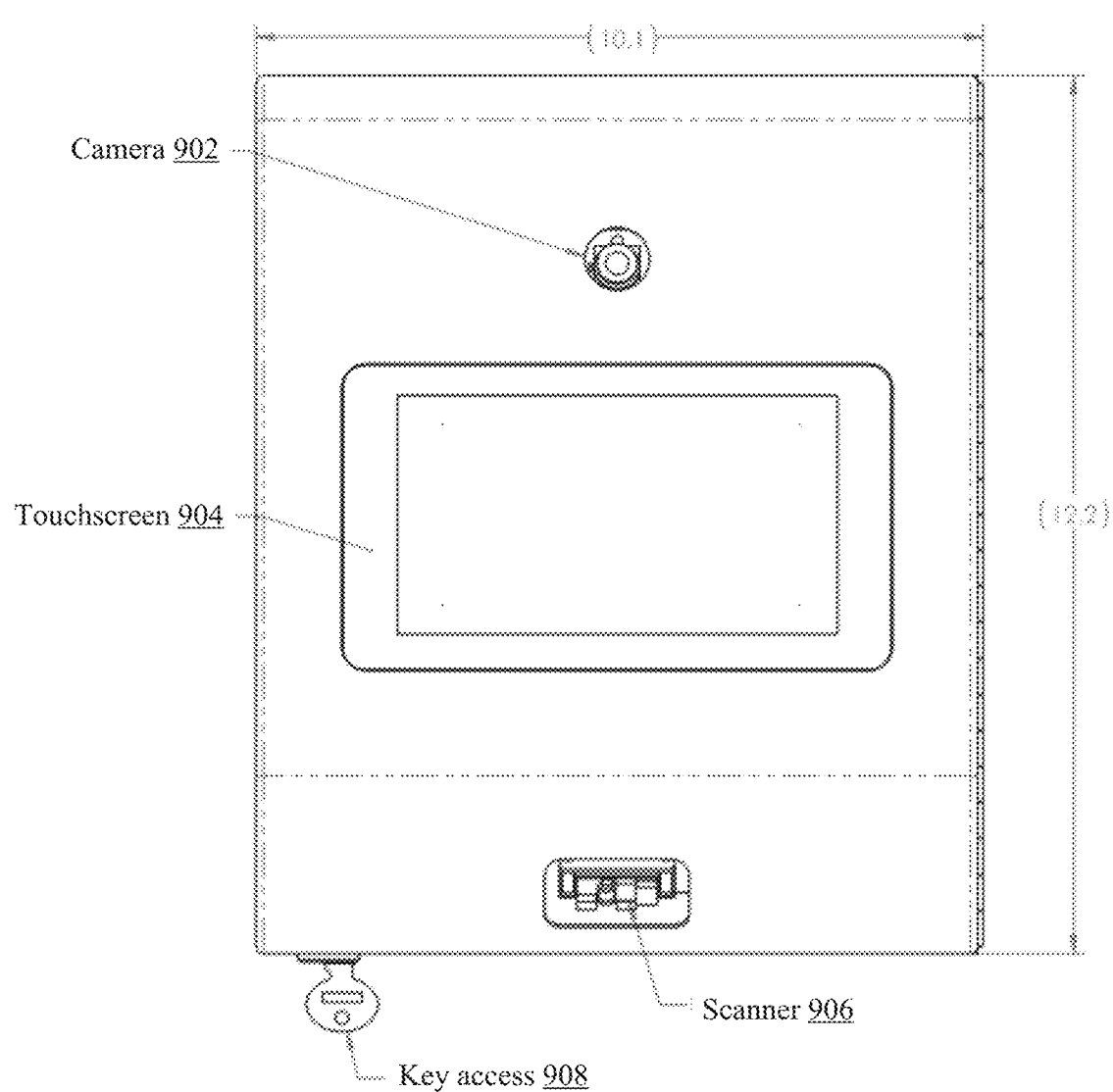
Figure 9C:
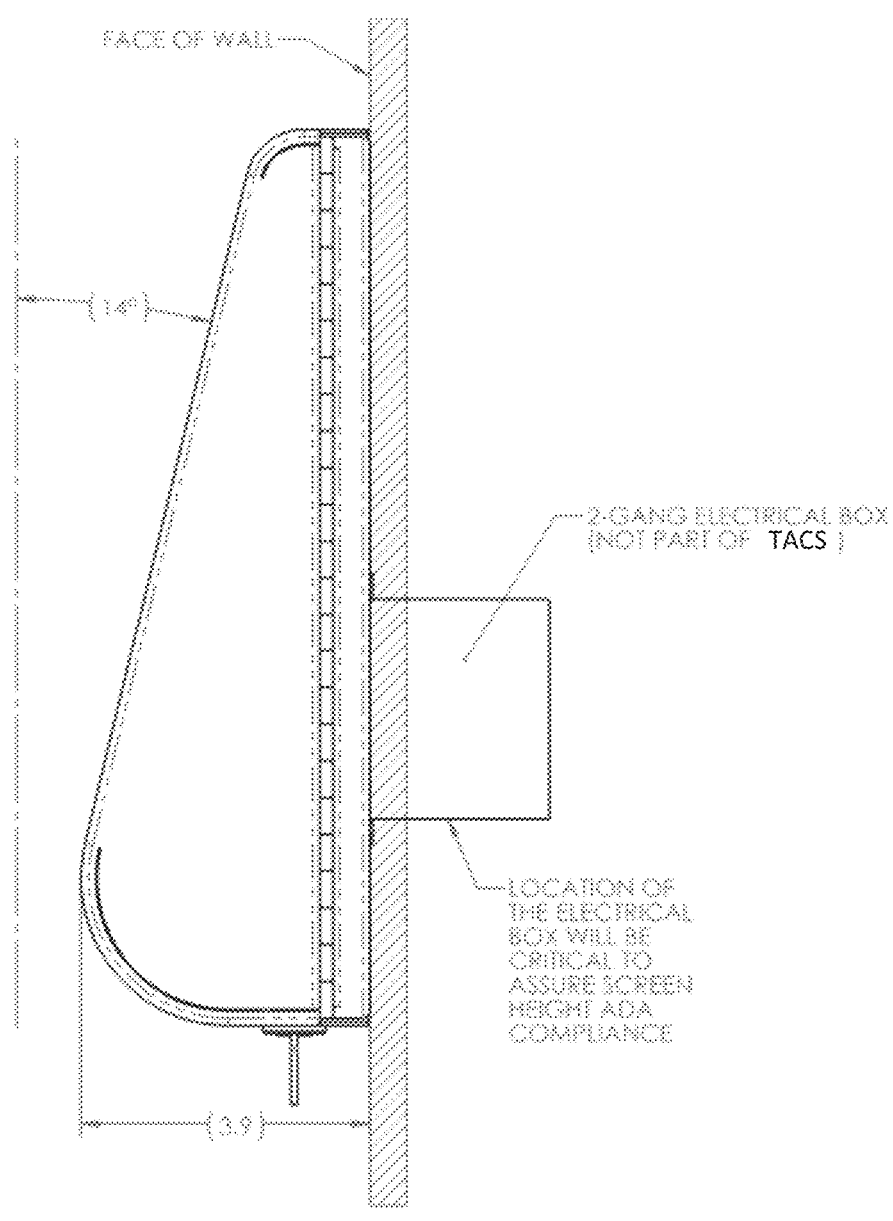
Figure 9D:
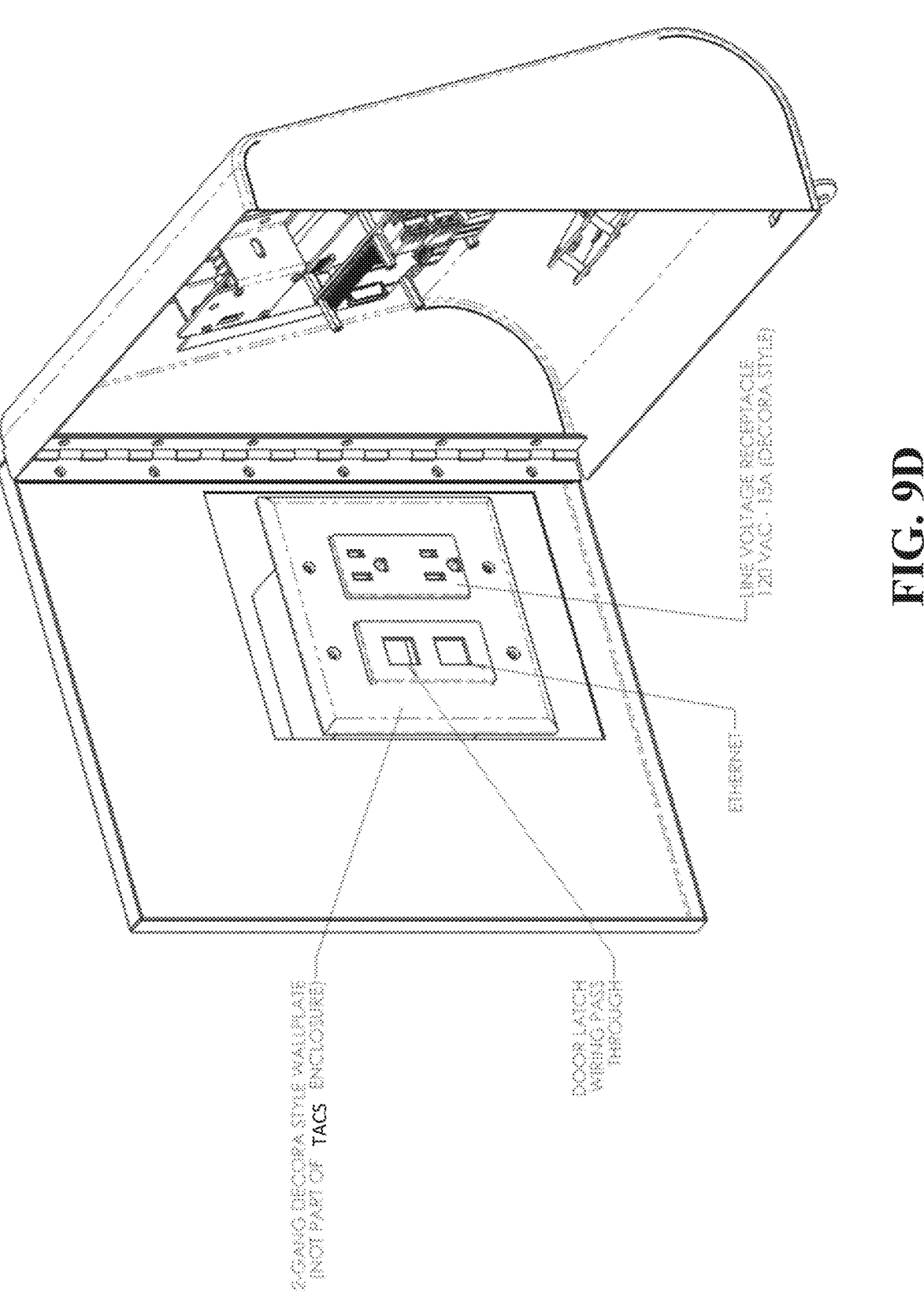

FIGS. 9A-9D illustrate several views of an example tour access control system according to an embodiment of the disclosure. FIG. 9A illustrates a perspective view, FIG. 9B illustrates a front view, FIG. 9C illustrates a side view, and FIG. 9D illustrates a view of the interior of the tour access control system. The tour access control system can have multiple methods for user access. For example, a guest can access the system using a barcode, e.g., via the scanner 906 configured to scan the barcode. The guest can access the system using key codes on an input device of the tour access control system, e.g., using a touchscreen 904 of the tour access control system. The tour access control system can also be accessed remotely via the tour management servers or an administrator. In FIG. 9D, the tour access control system can interface with an Ethernet port on a wall to provide remote access to the tour access control system. In addition, the tour management servers or an administrator can utilize video or intercom to aid in remotely activating a door managed by the tour access control system. The tour access control system can include a camera 902 for capturing photographs and/or video. In some embodiments, an emergency over-ride is provided for opening the door.

The tour access control system can be surface wall-mounted and can include a touchscreen monitor, a computer, a video intercom, a barcode scanner, a still camera, and so on. The tour access control system has access to power, an internet connection, e.g., Ethernet or wireless internet, and a locking mechanism. The tour access control system can allow a door to be locked or unlocked remotely. A wall-mounted tour access control system is provided in FIGS. 9C-9D where an opening on a back of a housing of the tour access control system allows access to power and internet connection. Additionally, in FIG. 9D, a door latch wiring pass-through is accessible to the tour access control system for sending electrical signals to unlock a door managed by the tour access control system.

In some embodiments, the tour access control system sends an unlock signal to a door, and the door remains unlocked for a predetermined amount of time. In some embodiments, the tour access control system sends an unlock signal to a door, and the door remains in an unlocked state until a user opens the door. Once the door is closed, the door is returned to a locked state. In some embodiments, the tour access control system receives signals indicating whether a door managed by the tour access control system is in a locked state, an unlocked state, and/or whether the door has been opened by a user after being placed in an unlocked state.

In some embodiments, users or guests authorized to use the tour access control system are managed by the property management systems 108 and/or third party integration systems 106 via the tour management servers 102. The tour management servers 102 can maintain a list of users authorized to enter a unit via the tour access control system. The list can be updated and managed by the property management systems 108 and the third party integration systems 106 to add and remove authorized users.

Figure 10:
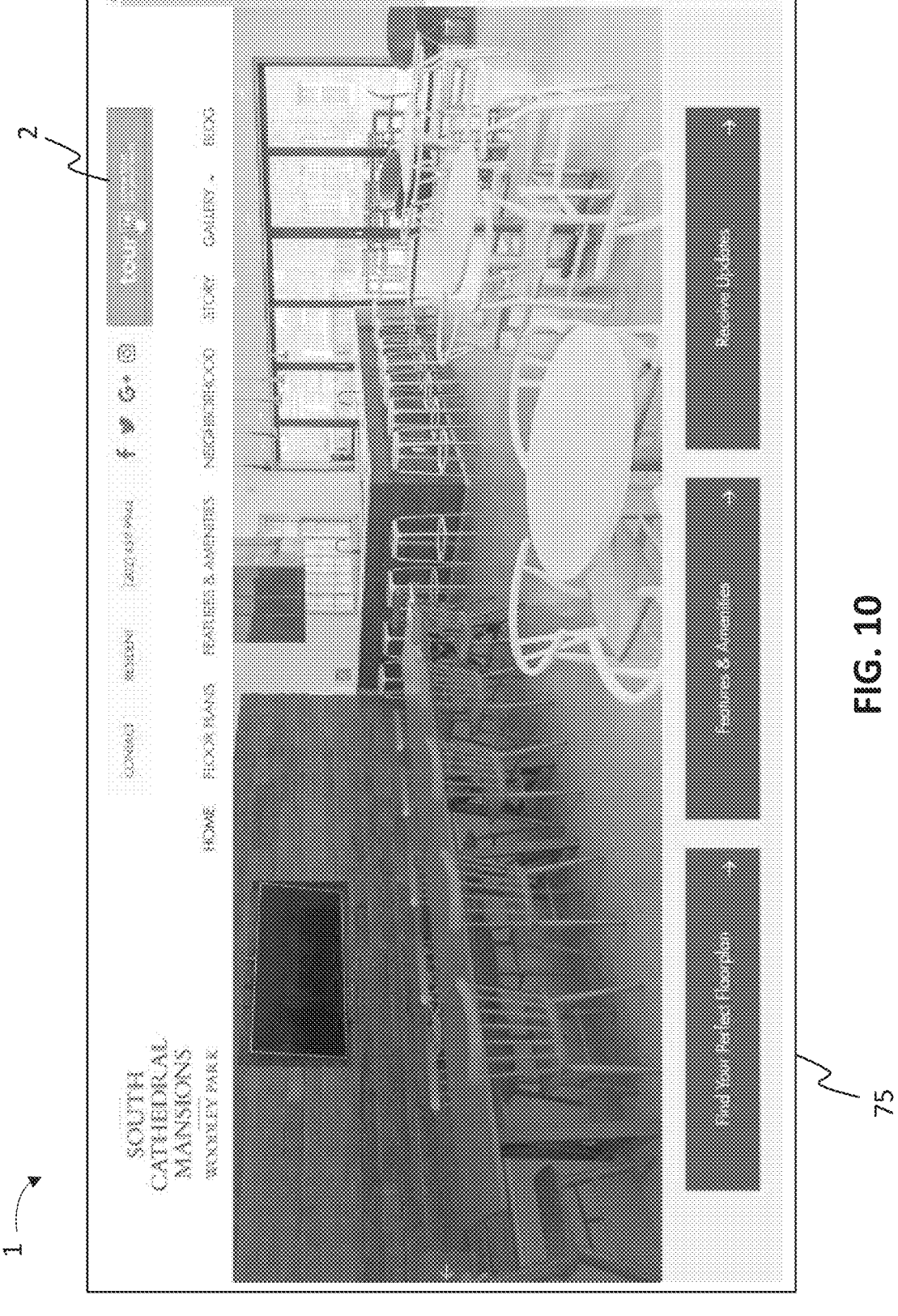
FIGS. 10-23 illustrate implementation examples of the method for scheduling a self-guided tour shown in FIG. 3.

FIGS. 10-23 illustrate implementation examples of the method for scheduling a self-guided tour shown and described above with reference to FIG. 3, according to embodiments of the disclosure. In one embodiment, receiving 308 guest information from the client device 110 includes receiving, by the tour server (e.g., one or more tour management servers 102), an indication of interest (IOI) for the self-guided tour (SGT) from a user of the client device 110. The IOI may be received by the tour server via the client device 110 user clicking on a website link. As shown in FIG. 10, a website 1 of a multi-unit residential facility (e.g., a luxury apartment complex property) is findable on the Internet by the user of the client device. The user browses to and views (e.g., on a display 75 of client device 110) the website 1 to learn more about the property. A website link 2 (e.g., labeled "tour24") present in one or more pages of the property's website 1 is present for the user to click on to learn about a self-guided tour for the property. Clicking on the website link 2 will cause the IOI to be transmitted to, and received by, the tour server as an IOI signal.

Figure 11:

Referring to FIG. 11, the IOI for the SGT may be received by the tour server as an IOI signal via the user scanning a QR code 4 or a barcode using the client device. In one example, the QR code 4 is present on a physical printed sign 3 such as may be found on a door or window of a leasing office of a multi-unit residential facility (e.g., apartment complex). In another example, the printed sign 3 having the QR code 4 or barcode may be hanging from a door knob of the leasing office.

Figure 12:
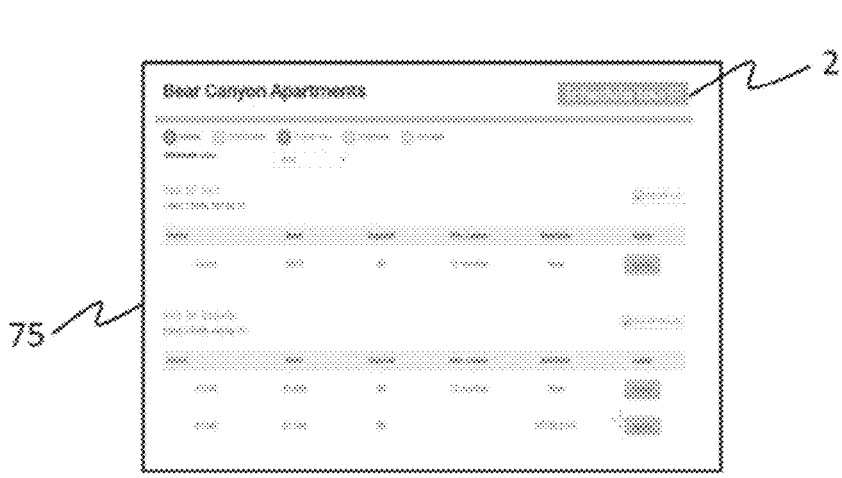
Figure 13:

In another embodiment, the website link 2 for a user to provide their IOI for the self-guided tour may be provided on any website where the property is advertised on the Internet. Similarly, the QR code 4 or barcode for scanning may be placed in association with the property in any print media where the property is advertised. The owner and/or management of the property may utilize a web inventory console window 5 provided to a display device 75 visible to the property owner and/or property management, as shown in FIG. 12. Window 5 may list all the websites where the property is advertised on the Internet, and the website link 2 may be dragged and dropped, for instance, onto each of the listed websites. Doing so activates the website link 2 for the particular website(s) such that the website link 2 will be visible in those website(s). Such websites may include an Internet Listing Service (ILS) which is visible as an ILS window 6, as shown in FIG. 13. User may, in the course of looking for an apartment, for example, use his or her client device 110 to browse to the ILS window 6 and thereby view it on the display 75 of the client device 110. If the property owner and/or management has authorized the website link 2 to be visible in the window 6, the use may click on it to provide their IOI for the self-guided tour of the property.

Additional or alternative techniques for enabling users to provide their IOI for a self-guided tour of a multi-unit residential facility may be understood by persons having ordinary skill in the art, and such other techniques (e.g., providing the website link 2 in an email to a user who has provided their email address to the property owner and/or management) are meant to be included within the scope of this disclosure. No matter how the IOI may be provided to, and received by, the tour server, the process step of receiving 308 guest information from the client device 110 also includes causing, by the tour server, a self-guided tour registration window to be displayed to the user of the client device 110 (e.g., via the display 75 of the client device). In an example, the tour registration server causes the registration window to be displayed to the user in response to the tour server receiving the IOI by one or more of the techniques described above.

Figure 14:
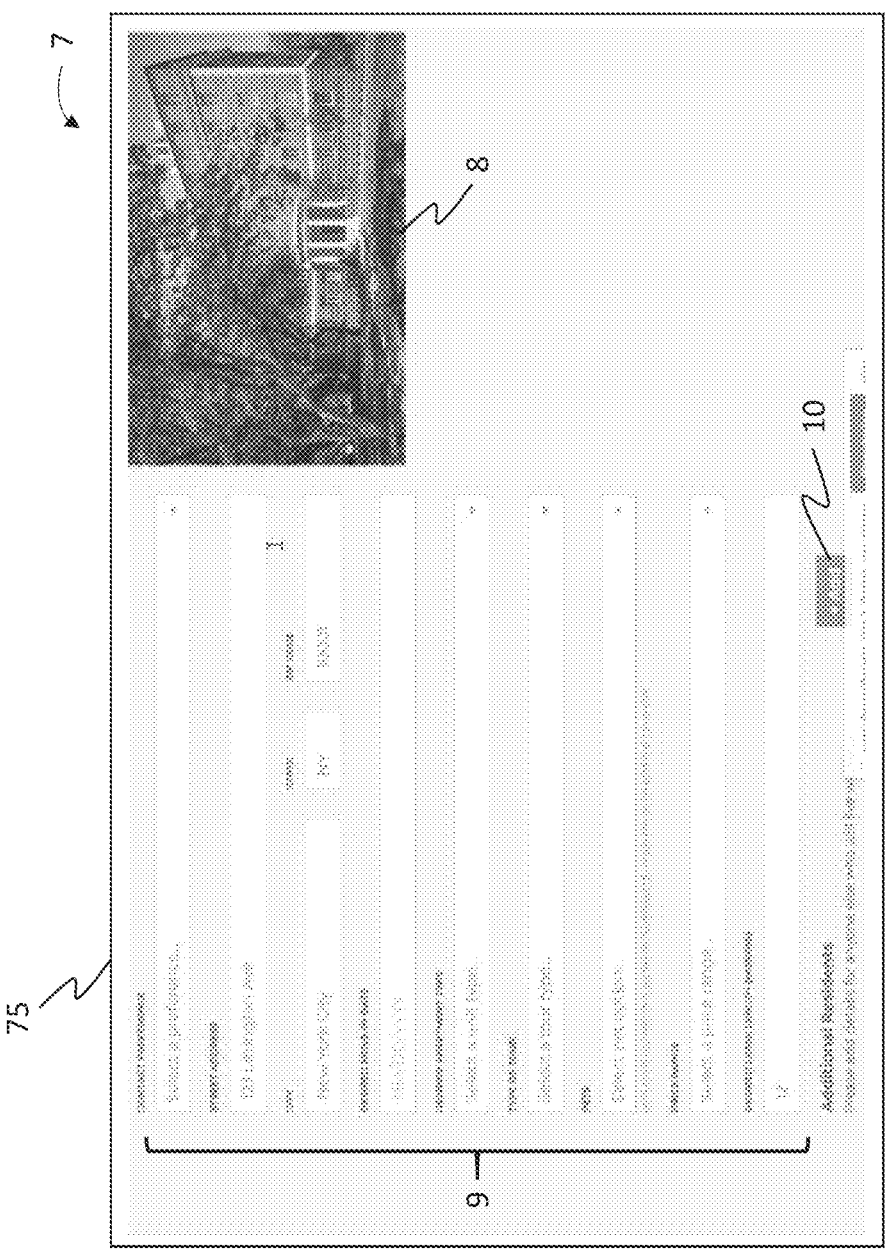

As shown in FIG. 14, the registration window 7 includes a plurality of data fields 9 for the user of the client device 110 to enter information such as name, address, email, telephone number(s) and additional information related to what they are looking for in an apartment (e.g., rental price range, whether they have a pet, etc.). If the user will have a roommate, then he or she may click on or press an add button 10 in order to provide the same or similar information for the at least a second person. The registration window 7 may include one or more photos 8 of the property.

Figures 15, 16, 17:
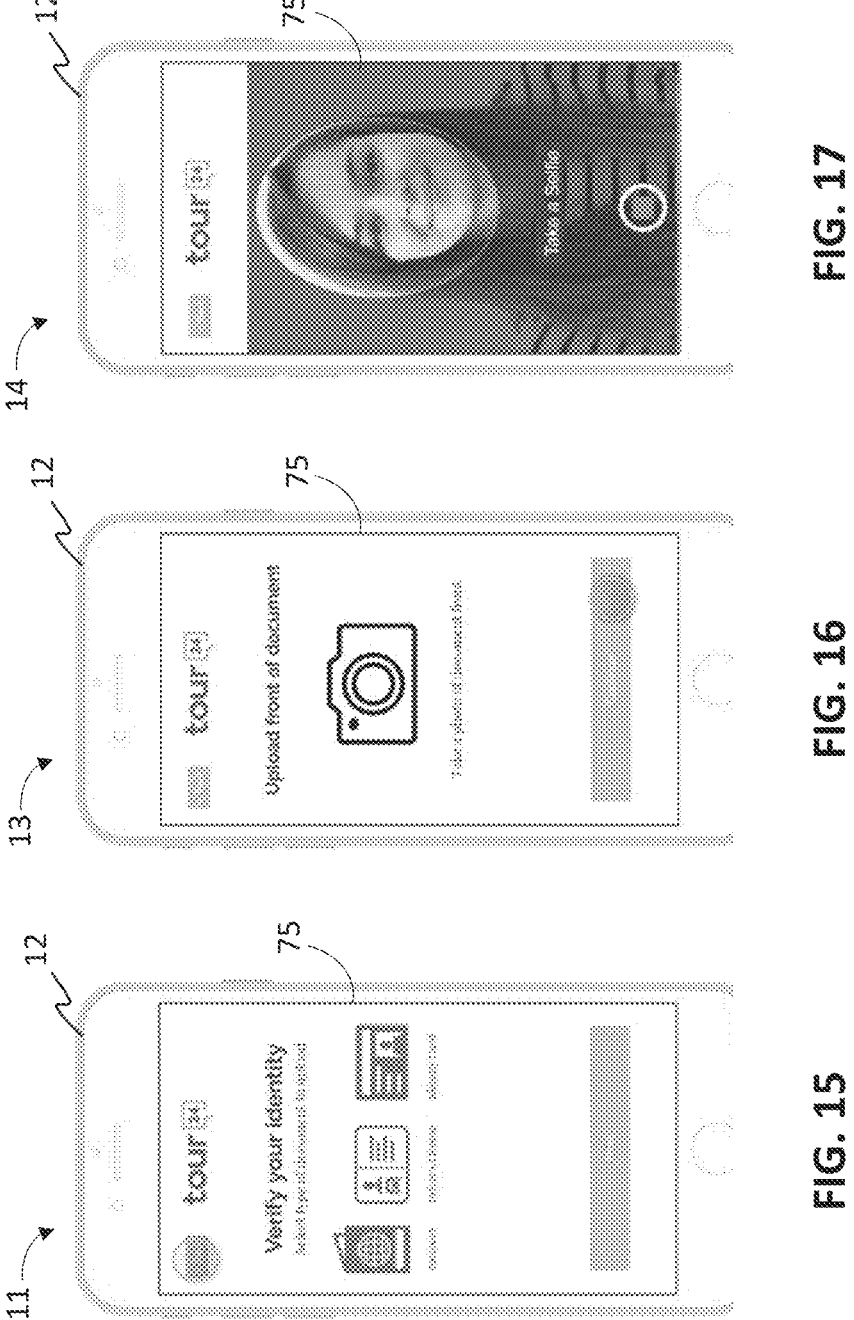

Upon completion of entry of information by the user in the registration window 7 (e.g., by hitting enter or pressing a "done" or "continue" button on the registration window 7), the guest information so entered is transmitted to, and received by, the tour server. In one embodiment, receiving 320 identification (ID) information from the client device 110 includes, in response to receiving the guest information (and/or the payment information) from the client device, causing, by the tour server, one or more ID information request windows to be displayed to a user of the client device 110 (e.g., via the display 75 of a smartphone 12 client device), as shown in FIGS. 15-17. A first ID information request window 11 provides options for using government-issued ID cards or documents including a passport, a driver's license, or an identity card. A second ID information request window 13 provides an interface to use the client device 110 camera to take a photo of at least a first side (e.g., the front) of the government-issued ID card or document selected from the first window 11. A third ID information request window 14 provides an interface to use the client device 110 camera to take a self-portrait ("selfie"). One or more of the first 11, second 13, and third 14 ID information request windows may include instructions for the user to use a camera of the client device 110 to: take the photo of a first side of a government-issued ID card or document using the client device, and/or take the selfie. In an example, the at least a first side of the government-issued ID card or document includes: a portrait of, and a name of, a person to whom the government-issued ID card or document was issued. In another example, the one or more ID information request windows (e.g., second ID information request window 13) further includes instructions for the user to use the camera of the client device 110 to take a photo of a second side of the government-issued ID card or document.

In one embodiment, determining 324 whether the ID information is valid includes causing, by the tour server, the ID information to be transmitted to an ID verification provider for validation. In an example, the tour server transmits the ID information to the ID verification provider in response to receiving the ID information (e.g., the user hits enter or presses a "done" or "continue" button on the ID information request window(s) (e.g., 11, 13, and/or 14)). The ID verification provider receives the selfie and the photo of the at least a first side of the government-issued ID. The selfie is compared to the portrait on the government-issued ID and, optionally, the guest information provided in the registration window 7 is matched to a database associated with the government-issued ID. The ID verification provider then transmits, and the tour server receives, a validation status message, which provides an indication of whether the user's ID information is valid (e.g., a bona fide match-a positive ID validation status message) or invalid (e.g., use of a fake ID is suspected-a negative ID validation status message).

In an embodiment, if a positive validation status message is received by the tour server, then the tour server enables the user of the client device 110 to continue with scheduling the SGT for a current session. Otherwise, for a negative validation status message received by the tour server from the ID verification provider, the tour server disables the user of the client device 110 from continuing with scheduling the SGT for the current session. In one example, the tour server may allow the user to begin again by displaying, for instance, an error message and a "try again" button. In another example, the tour server performs a quality check on the photo(s) of the government-issued ID and the selfie prior to transmitting this ID information to the ID verification provider so as to reduce the chance of error on the part of the user during data collection via the camera of the client device. In such examples, upon receiving the negative validation status message, the tour server may refuse to allow the user to try again for a specified period of time, or tour server may ban the user from ever trying to schedule a self-guided tour.

Figures 18, 19, 20:
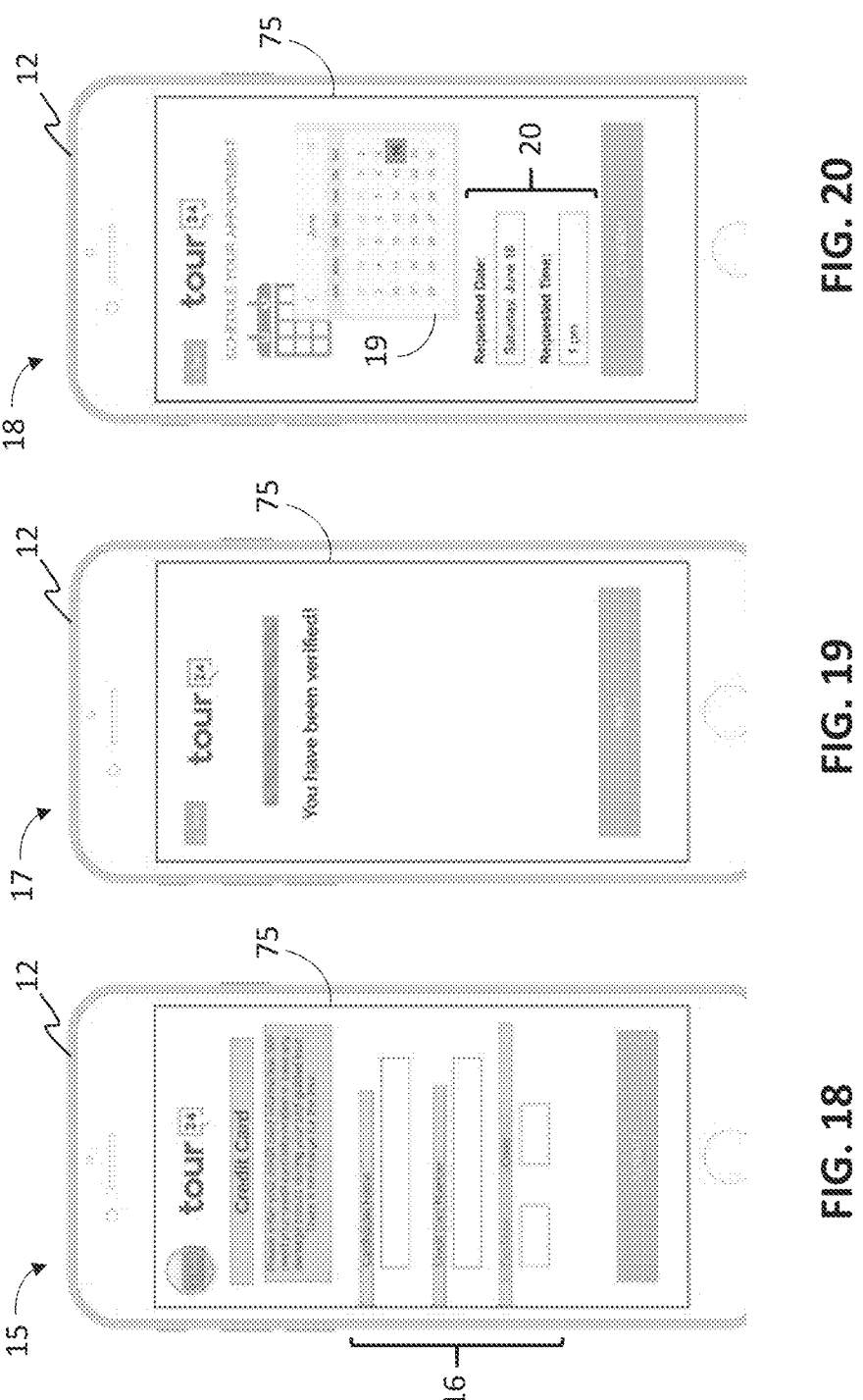

In one embodiment, receiving 314 payment information from the client device 110 includes, in response to receiving the guest information (and/or the ID information) from the client device, causing, by the tour server, a payment information window 15 to be displayed to a user of the client device 110 (e.g., on the display 75), as shown in FIG. 18. The payment information window 15 includes a plurality of credit card data fields 16 for the user to enter payment information into. In an example, the user may instead enter debit card data using the same fields 16.

In one embodiment, determining 318 whether the payment information is valid includes causing, by the tour server, the payment information to be transmitted to a payment provider for validity verification. In an example, the tour server transmits the payment information to the payment provider in response to receiving the payment information (e.g., the user hits enter or presses a "done" or "continue" button on the payment information window 15). The payment provider receives the payment information, and processes it against, for example, a database associated with credit and/or debit card account information. The payment provider then transmits, and the tour server receives, a verification status message regarding the payment information and the identity attached to it. The verification status message provides an indication of whether the user's payment information is valid (e.g., a bona fide match-a positive verification status message) or invalid (e.g., a closed account-a negative verification status message).

In an embodiment, if a positive verification status message is received by the tour server, then the tour server enables the user of the client device 110 to continue with scheduling the SGT for a current session. Otherwise, for a negative verification status message received by the tour server from the ID verification provider, the tour server disables the user of the client device 110 from continuing with scheduling the SGT for the current session. In one example, the tour server may allow the user to begin again by displaying, for instance, an error message and a "try again" button. In another example, the tour server, upon receiving the negative verification status message, may refuse to allow the user to try again for a specified period of time, or tour server may ban the user from ever trying to schedule a self-guided tour.

In one embodiment, the tour server receives the payment information prior to receiving the ID information, and tour server transmits the ID information to the ID verification provider in response to receiving the payment information, or in response to receiving both the payment information and the ID information. In another embodiment, the tour server receives the ID information prior to receiving the payment information, and tour server transmits the payment information to the payment provider in response to receiving the ID information, or in response to receiving both the ID information and the payment information. In other words, steps 314 and 318 may be performed in the disclosed method before steps 320 and 324 are performed, or, alternatively, steps 314 and 318 may be performed after steps 320 and 324 in the disclosed method.

As shown in FIG. 19, upon receipt of the positive verification status message and a positive ID validation message, tour server may cause a verification window 17 to be displayed to the user of the client device 110 (e.g., via display 75 of smartphone 12), as shown in FIG. 19. In one embodiment, receiving 326 the tour time from the client device 110 includes, in response to determining that the payment information and the ID information is valid, causing, by the tour server, a scheduling window 18 to be displayed to a user of the client device 110 (e.g., via display 75) for selecting the tour time, as shown in FIG. 20. The scheduling window 18 includes a Gregorian calendar graphic 19. In an example, the user of the client device 110 may touch a date on calendar 19 for a desired self-guided tour time for the property of interest. Doing so populates at least two data fields 20 in window 18. In an example, for the selected date from calendar 19, a field 20 for requested time for that date functions as a drop down box, in which the currently available times for the SGT of the subject property are populated, and selectable by the user.

In one embodiment, the method for scheduling a self-guided tour shown and described above with reference to FIG. 3 further includes maintaining, by the tour server, availability data for a plurality of time slots for the SGT. In an example, the aforementioned step of causing the scheduling window 18 to be displayed to the user of the client device 110 for selecting the tour time includes causing, by the tour server, only available time slots to be displayed to the user of the client device 110 (e.g., in the aforementioned drop down box of fields 20 in window 18).

Figure 21:
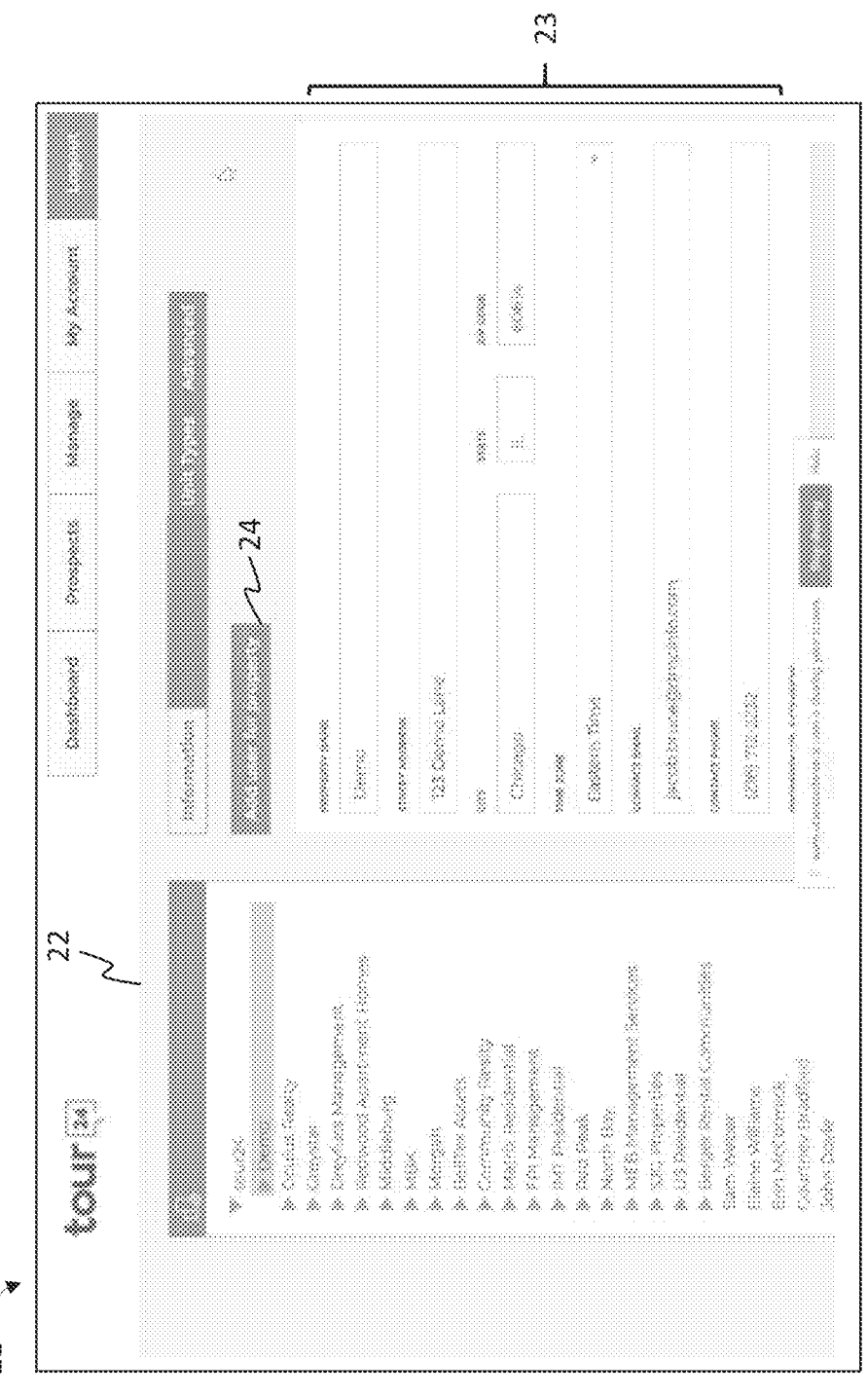

Referring now to FIG. 21, the method for scheduling a self-guided tour shown and described above with reference to FIG. 3 may further include, in response to receiving the guest information from the client device, causing, by the tour server, the guest information to be at least one of: stored in memory of, and/or in communication with, tour server; and transmitted to a computing device associated with the multi-unit residential facility (MURF). The guest information data and, optionally, associated metadata, are viewable to the owner and/or management of the MURF property of interest (e.g., subject of the SGT for which the user provided the IOI) on a web portal 21. Tour server may provide web portal 21 via, for instance, the Internet and, for example, as software as a service (SAAS). In one embodiment, web portal 21 may be viewed and interacted with on a display 75 of the computing device associated with the MURF. In another embodiment, web portal 21 may be viewed and interacted with on a display 75 of a computing device associated with a user, administrator, and/or servicer of the tour server. In yet another embodiment, web portal 21 may be viewed and interacted with on displays 75 of computing devices associated with both the MURF and the tour server.

In an example, web portal 21 is customized or customizable by, or according to the desires of, the owner or management of the MURF and/or the administrator of the tour server (e.g., Tour24). Thus, web portal 21 may contain more, or fewer, windows, data fields, and/or functionality as compared to those examples shown and described herein. Web portal 21 may include a listing 22 of properties. For the tour server view of web portal 21, all properties who have subscribed to the self-guided tour service may be listed in listing 22. By contrast, for example, for the MURF view of web portal 21, only those properties associated with (e.g., owned and/or operated by) are shown in listing 22. Web portal 21 may include a plurality of data fields 23 for guest information received 308 by tour server, as described above. These fields 23 are auto-populated upon receipt 308 of the guest information by the tour server. These data are displayed in both the tour server view, and the MURF view, of web portal 21. In the event that MURF receives guest information through manual channels outside of those processes described above for the receiving step 308, web portal 21 includes an add button 24 so that such guest information may be added and be viewed in either the MURF or the tour server views of web portal 21.

In one embodiment, the method for scheduling a self-guided tour shown and described above with reference to FIG. 3 further includes, in response to determining that the payment information and the ID information is valid, flagging, by the tour server, the guest information as validated guest information prior to or concurrently with causing the guest information to be at least one of: stored in memory, and transmitted to the computing device associated with the MURF subject of the SGT. In an example, the guest information from the receiving step 308 is both automatically stored in a memory associated, or in communication, with the MURF computing device, and the received 308 guest information is auto-populated in the web portal 21. In this manner, the MURF property owner and/or management may retain the guest information outside the web portal 21 and may utilize it in any way that they wish to.

Figure 22:
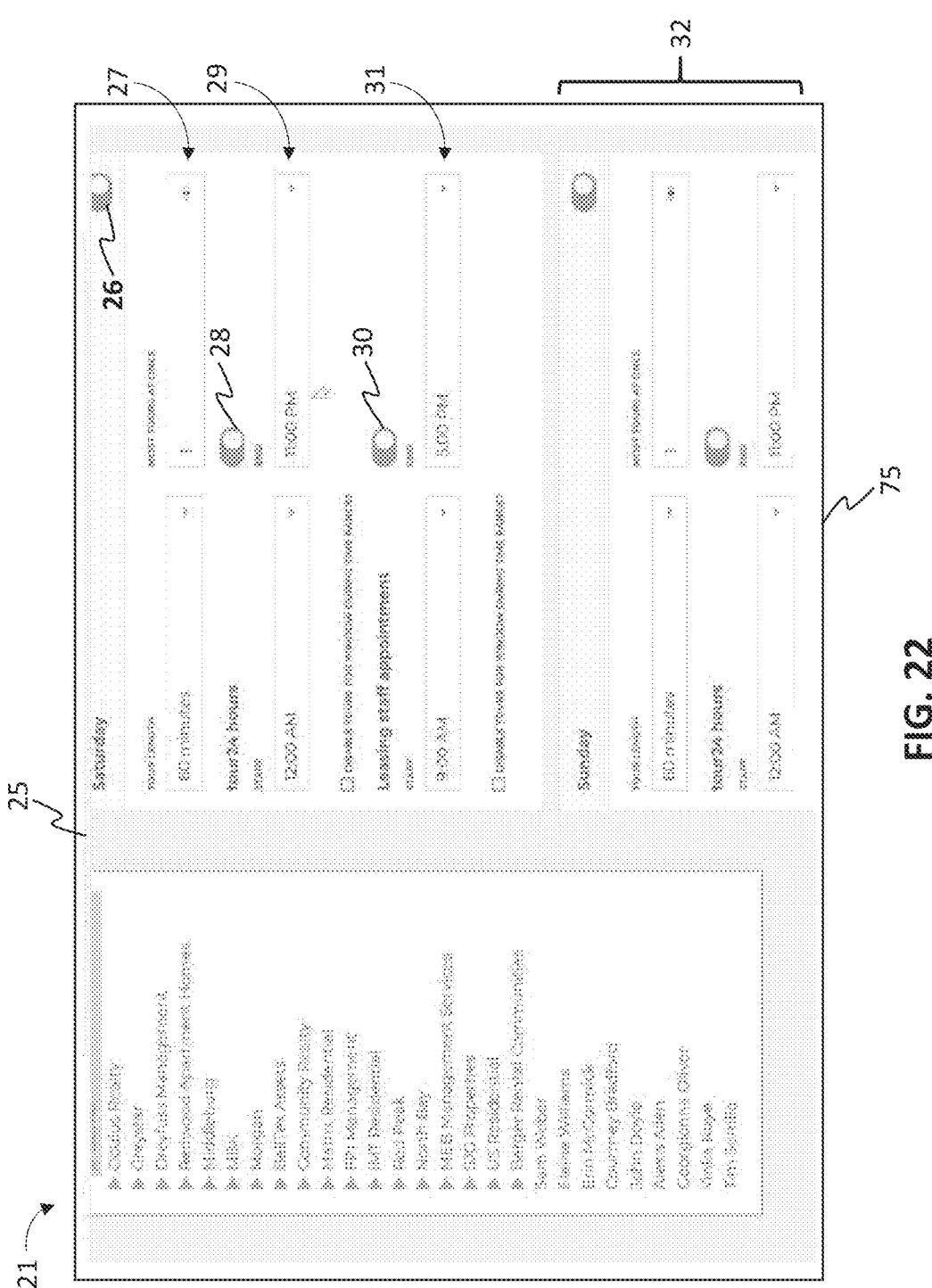

Referring to FIG. 22, the web portal 21 includes various functionality by which the owner and/or management of the MURF property may specify which times and/or dates are available for self-guided tours. In one embodiment, web portal 21 includes an availability window 25. Window 25 provides owners and/or management of a MURF property to specify which days of the week and times thereon during which SGTs are available. As described above with reference to FIG. 20, the days and times specified here in the availability window 25 will correspond to those that, if they are not already scheduled for SGT(s), will be displayed to user of the client device 110 in the drop down of field 20 in scheduling window 18. Days of the week may be specified as being open or closed to scheduling SGTs by alternately turning on and off a day toggle switch 26 in window 25.

Within a particular day of the week that is turned on for SGT availability, a length of time for SGT time slots and the number of SGTs that may be scheduled at the same time may be entered into data fields 27, which may include drop down menu functionality. Within a particular day of the week, start and end times for scheduling SGTs may be desired to be specified. To enter a start time for SGTs on that day, an SGT time toggle switch 28 is alternately toggled on and off. With SGT time toggle switch 28 toggled on, start and end times for SGTs may be entered in data fields 29. Data fields 29 may include drop down menu functionality. In the example illustrated in FIG. 21, for a particular day of the week, start and end times for scheduling leasing staff appointments may be desired to be specified. To enter a start time for leasing staff appointments that day, an appointment time toggle switch 30 is alternately toggled on and off. With appointment time toggle switch 30 toggled on, start and end times for leasing staff appointments may be entered in data fields 31. Data fields 31 may include drop down menu functionality. For another (e.g., consecutive) day of the week, fields 32 are provided in the availability window 25, which includes analogous functionality as described above with reference to FIG. 22.

Figure 23:
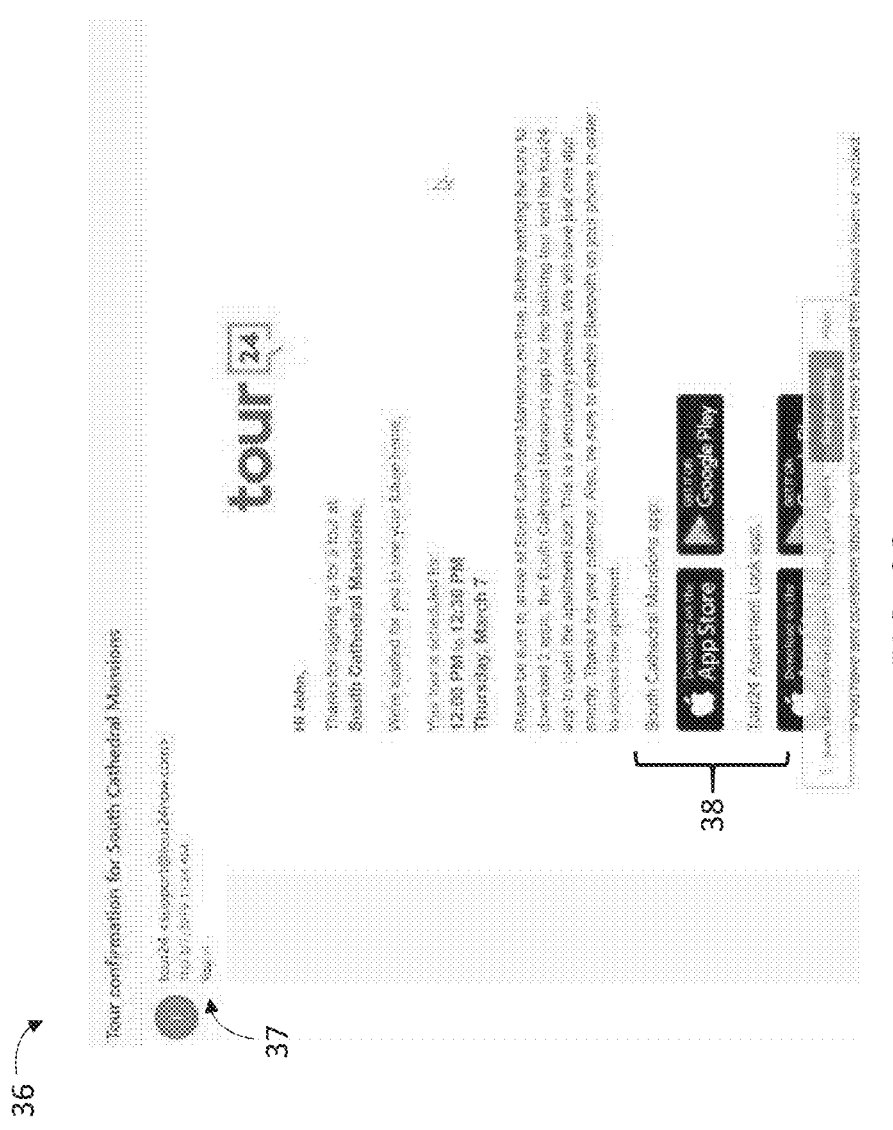

The received 308 guest information includes at least one of: an email address, and a mobile phone number, of a user of the client device. In one embodiment, providing 328 the confirmation including the tour time to the client device 110 includes causing, by the tour server, the confirmation to be transmitted to the user of the client device 110 (e.g., via display 75) as at least one of: an email to the email address; and a text or multimedia message to the mobile phone number. As shown in FIG. 23, in an example, an email 36 (and/or text or multimedia message) confirmation sent to a user's email address 37 (or mobile phone number) includes instructions and/or one or more link(s) 38 for client device 110 user (e.g., recipient of the confirmation) to download one or more apps to the client device 110 for the SGT, as further shown and described below.

FIGS. 24-37 illustrate implementation examples of the method for performing a self-guided tour (SGT) shown and described above with reference to FIG. 4, according to embodiments of the disclosure. In one embodiment, the method for performing a self-guided tour further includes determining, by the tour server, start and end times for the SGT. In an example, the start and end times for the SGT are determined in response to the tour time being obtained 326. In the embodiment, the step of sending 404 the property access information to the client device 110 may further include sending, by the tour server, the property access information having an activity period that is restricted to a period of time from the determined start time to the determined end time. The property access information is thus provided for the SGT with a window of active usability, for example, a period of time corresponding to the scheduled start time of the SGT plus/minus a time window to allow for early or late arrival. This allows the MURF property guest who scheduled the SGT to enter the premises for the SGT, but not come and go repeatedly. After the expiration of the period of time that the property access information is active for use, it will expire and no longer be available for use by anyone to gain access to the MURF premises. In another example, the property access information is sent 404 to the client device 110 within a predetermined before a scheduled start time for the SGT.

Figure 24:
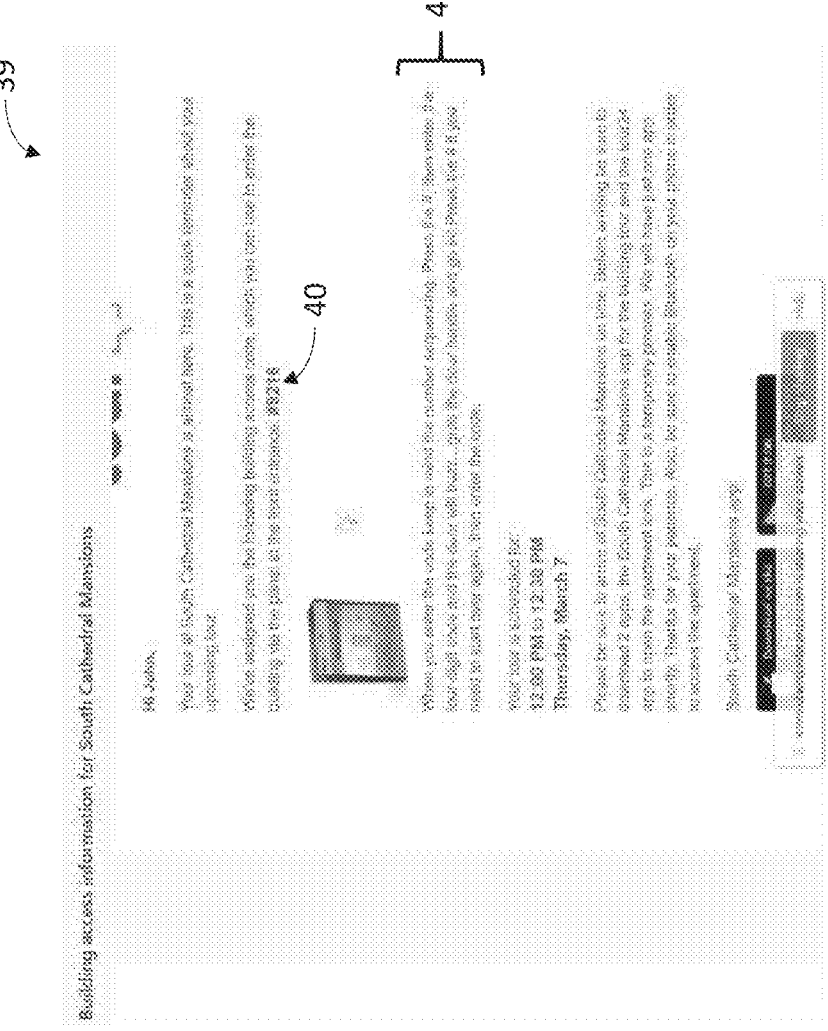
FIGS. 24-37 illustrate implementation examples of the method for performing a self-guided tour shown in FIG. 4.

In one embodiment, the step of sending 404 the property access information to the client device 110 includes causing, by the tour server, a property access message 39 to be transmitted to a user of the client device 110 (for viewing on display 75) as at least one of: an email, a text message, and a multimedia message, as shown in FIG. 24. In the illustrated example, the property access message 39 includes an access code 40 to be entered into a code entry device (e.g., a keypad or touchpad) of a property access system (e.g., the tour access control system 104 of FIGS. 9A-9D) for the user of the client device 110 to gain access to the MURF for the SGT. In this example, message 39 may also include text instructions 41 for the user of the device to operate the property access system to gain access to the MURF for the SGT using the access code. Additionally, or instead, the message 39 may include a QR code (and/or a barcode) to be scanned by a reader device of the property access system for the user of the client device 110 to gain access to the MURF property for the SGT. In an example, message 39 includes text instructions 35 for the user of the client device 110 to operate the property access system to gain access to the MURF for the SGT using the QR code (or barcode).

Figure 25:
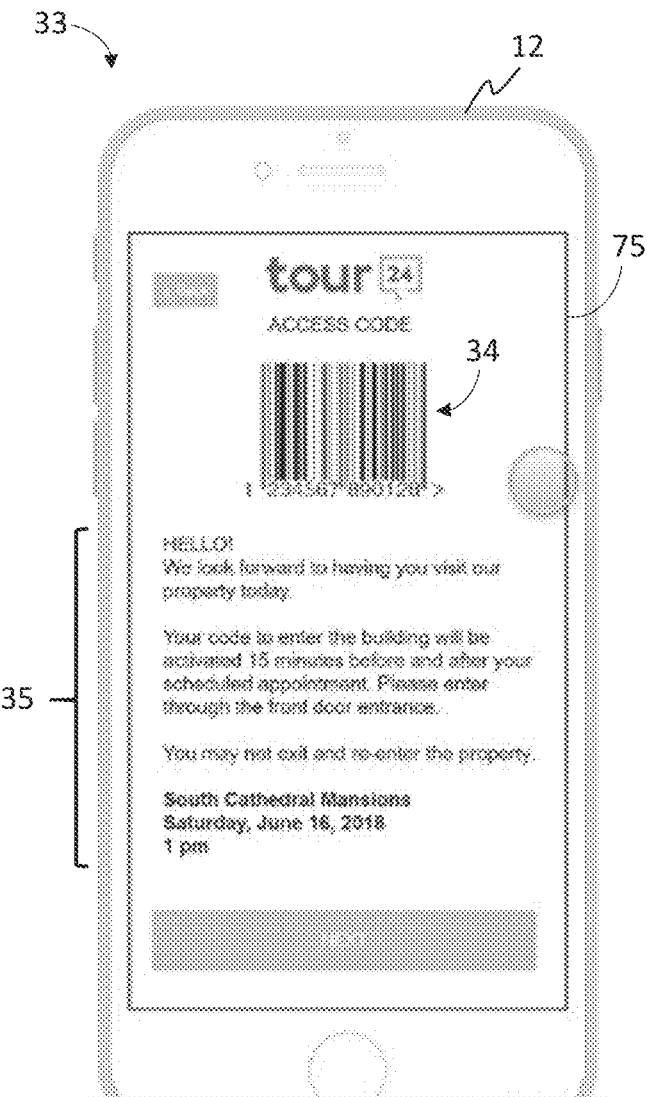

In one embodiment, sending 404 the property access information to the client device 110 includes causing, by the tour server, a property access window 33 to be displayed to a user of the client device 110 (e.g., via its display 75 of smartphone 12), as shown in FIG. 25. In the example shown in FIG. 25, the property access window 33 includes a QR code 34 (and/or a barcode) to be scanned by the reader device of the property access system for the user of the client device 110 to gain access to the MURF property for the SGT. In an example, window 33 includes text instructions 35 for the user of the client device 110 to operate the property access system to gain access to the MURF for the SGT using the QR code (or barcode). In another example, the property access window 33 includes an access code to be entered into the code entry device (e.g., a keypad or touchpad) of the property access system for the user of the client device 110 to gain access to the MURF for the SGT. In this example, window 33 may also include text instructions for the user of the device to operate the property access system to gain access to the MURF for the SGT using the access code.

The tour directions for the MURF may be provided 412 to the client device 110 in response to receiving 406 the trigger, as described above with reference to FIG. 4. Tour directions for the MURF may be provided 412 to the client device 110 based on a tour schedule for the SGT. Referring to FIGS. 26-31, the step of providing 412 the tour directions for the MURF to the client device 110 includes causing, by the tour server, one or more tour guide windows to be displayed to a user of the client device 110 (e.g., on display 75 of smartphone 12). The one or more tour guide windows including one or more of: map(s), floorplan(s), three-dimensional (3D) rendering(s), photograph(s), image(s), and/or sketch(es), of the MURF property premises.

In an example, causing the one or more tour guide windows to be displayed to the user comprises causing, by the tour server, a tour path through the MURF to be highlighted on the one or more of: the map(s), the floorplan(s), the 3D rendering(s), the photograph(s), the image(s), and/or the sketch(es), of the MURF. In this manner, the tour path may facilitate the user navigating the MURF for the SGT. In another example, causing the one or more tour guide windows to be displayed to the user of the client device 110 includes causing, by the tour server, locations of at least one of: a model unit, and one or more amenities (e.g., a lobby, a fitness center, a pool, a community room, etc.), of the MURF to be labeled on the one or more of: the map(s), the floorplan(s), the 3D rendering(s), the photograph(s), the image(s), and/or the sketch(es), of the MURF. In this manner, labeling these locations in the MURF may facilitate the user navigating to them during their SGT. In yet another example, providing 412 the tour directions for the MURF to the client device 110 includes causing, by the tour server, audible speech to be transmitted to a user of the client device 110 (e.g., via a speaker of the smartphone 12). The audible speech includes verbal instructions to the user for navigating the multi-user residential facility to locate at least one of: a model unit, and one or more amenities, of the MURF for the SGT. In this manner, MURF guests engaged in SGTs may listen to the tour directions and/or to information about the model unit and/or the amenities therein instead of, or in addition to, reading textual information about the same.

Figures 26, 27, 28:
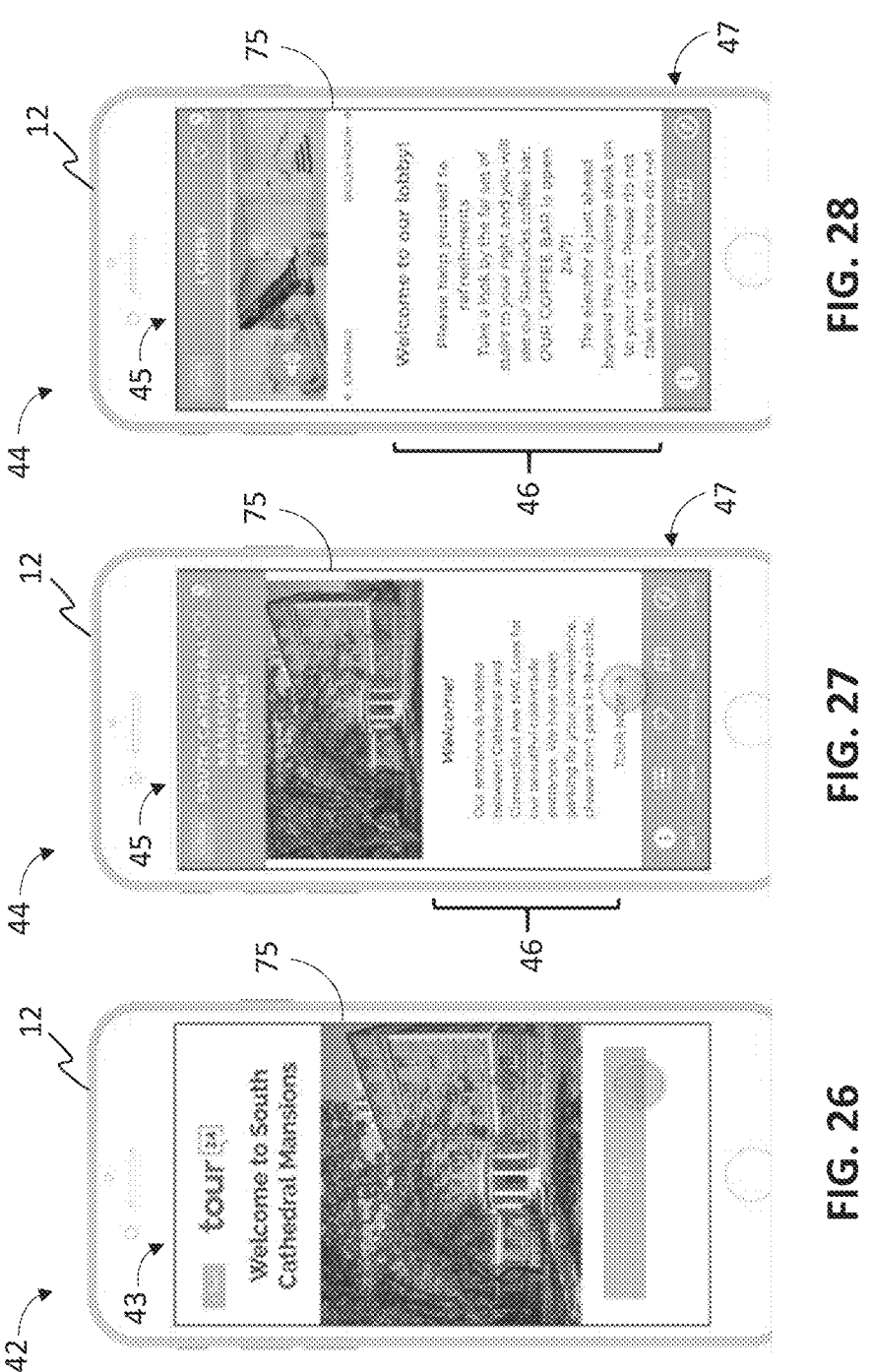

As shown in FIG. 26, the one or more tour guide windows may include a welcome window 42 displayed to the user of the client device 110 (e.g., via display 75 of smartphone 12) upon their arrival at the front entrance of the MURF premises. In an example, the tour server causes the welcome window 42 to be displayed in response to receiving the trigger. In another example, the tour server causes the welcome window 42 to be displayed in response to the user successfully using the property access information to gain entry to the MURF premises. Welcome window 42 is thus a first of the one or more tour guide windows to be displayed to the guest embarking on the SGT following their arrival at the MURF property.

Referring now to FIGS. 27-29 and 31, in one embodiment, a tour location window 44 (also referred to herein as "informational windows") is displayed to the user of the client device 110 for respectively visited locations in the MURF premises. As shown in FIG. 27, a first location visited by the guest engaged in the SGT may be the entrance to the MURF premises. As such, tour location window 44 includes a textual label 45 indicating the location the SGT guest is presently visiting. Additionally, for the various locations being visited, the tour location window 44 includes textual information 46 corresponding to the respective location being visited on the SGT. In an example, the method for performing the SGT may further include causing, by the tour server, the information for at least one of: the model unit, the one or more amenities, and other MURF locations, to be transmitted to the user of the client device 110 (e.g., via a smartphone 12 speaker or via headphones in communication with the smartphone 12) as audible speech.

During the SGT, the tour server also causes a toolbar 47 to be displayed to the user of the client device 110 for interacting in various ways with tour server via, for example and without limitation, an app running on the smartphone 12. Similarly, upon the user of the client device 110 passing through the MURF entrance and arriving at the next location (e.g., a lobby of the MURF premises), the tour location window 44 transitions to that next location, and provides the respective label 45 and corresponding information 46, while the toolbar 47 remains visible, as shown in FIG. 28.

Figures 29, 30, 31:
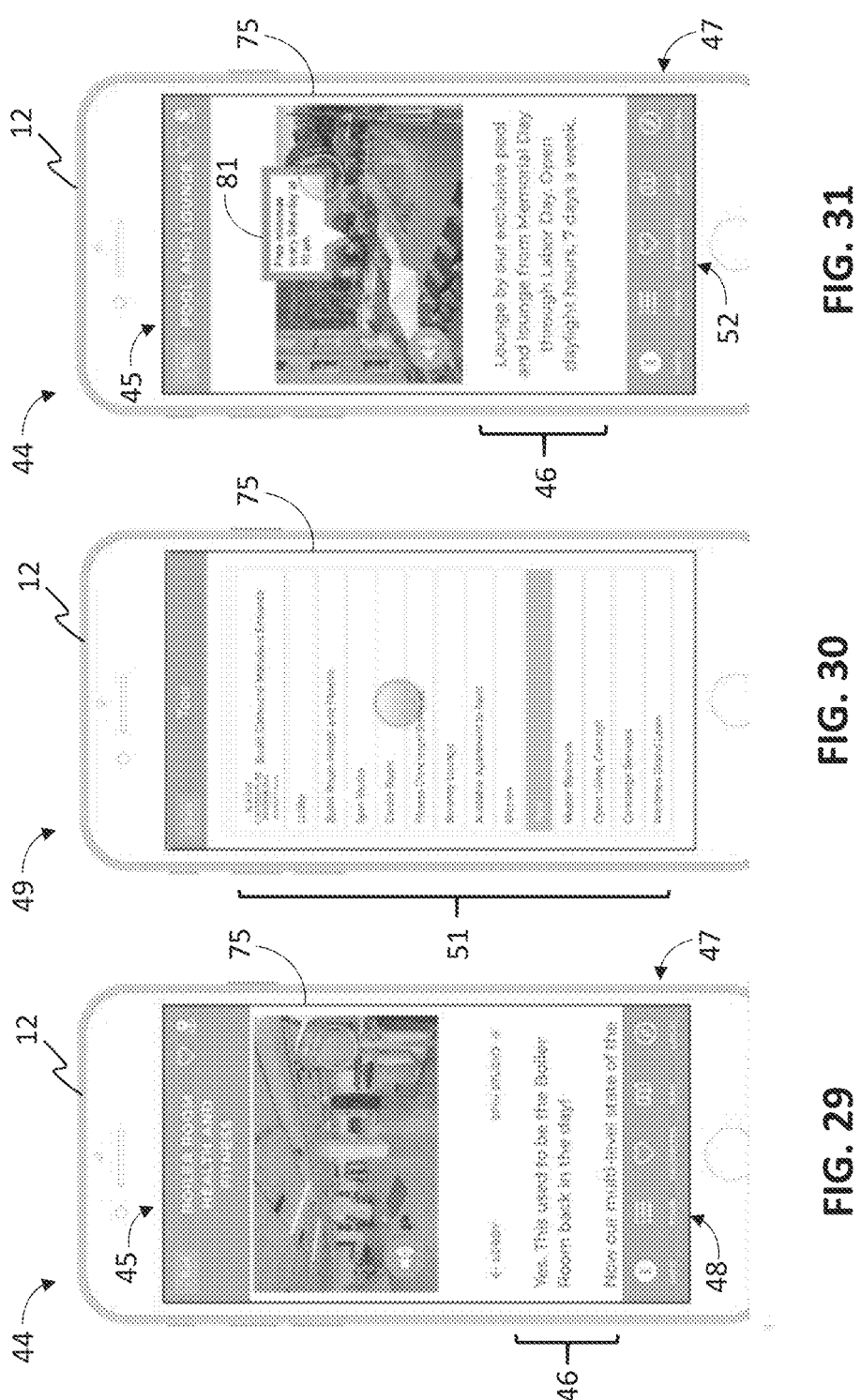

In an example, as shown in FIG. 29, a next stop for the user of the client device 110 to visit on the SGT may be an amenity (e.g., health and fitness center, pool, and the like) of the MURF property that is the subject of the SGT. The tour location window 44 displayed at the respective locations in the MURF may include a photo of the respective locations, as shown in FIGS. 26-29 and 31. In one embodiment, toolbar 47 includes a tour button 48. In response to the user pressing the tour button 48, the tour server causes a tour location listing window 49 to be displayed to the user of the client device, as shown in FIG. 30. Window 49 includes a listing 51 of all SGT locations that may be visited by the MURF guest on the SGT. In response to the user pressing one of the plurality of tour locations provided in the listing 51, the tour server causes the corresponding tour location window 44 to be displayed to the user of the client device. In this manner, the SGT guest of the MURF may conveniently view various locations and/or amenities available to be visited on the SGT besides the particular one he or she is presently visiting. This may facilitate the user of the client device 110 to plan and efficiently conduct the SGT and/or to return to particular locations or amenities for at least a second visit.

In one embodiment, the toolbar 47 may include a favorites button 52, as shown in FIG. 31. In response to the user pressing the favorites button 52, the tour server causes the particular location and/or amenity being visited, and for which the tour location window 44 corresponds, to be added to a favorites list for the user of the client device 110. In this manner, the SGT guest of the MURF may conveniently view various locations and/or amenities which they indicated as their favorite(s), which may, for instance, facilitate the user of the client device 110 to return to particular locations or amenities for at least a second visit, or pose questions about to leasing staff during follow-up conversations. Additionally, or instead, the tour server causes an indication that the client device 110 user has added the particular location and/or amenity to be transmitted as a signal to a computing device associated with the owner and/or management of the MURF premises that is the subject of the SGT.

As shown in FIG. 31, for the one or more informational windows including images or graphics of respective MURF locations and/or amenities, the method for performing the SGT may further include causing, by the tour server, one or more of: at least one tag 81, and at least one label, to be displayed to the user of the client device 110 (e.g., via display 75) on or proximate the images or graphics, as shown in FIG. 31. The one or more of: the at least one tag 81, and the at least one label, contains information about tagged or labeled features of the respective location and/or amenity, including, for example, a model residential unit (e.g., apartment model unit) of the MURF property, shown in the respective images or graphics. In the example illustrated in FIG. 31, the feature being further described in the tag 81 is relaying information about a regularly scheduled event at the MURF's pool.

Figure 33:
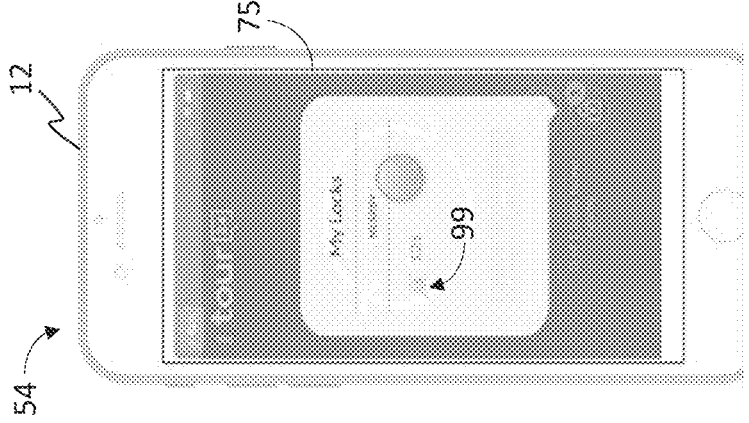
Figure 32:
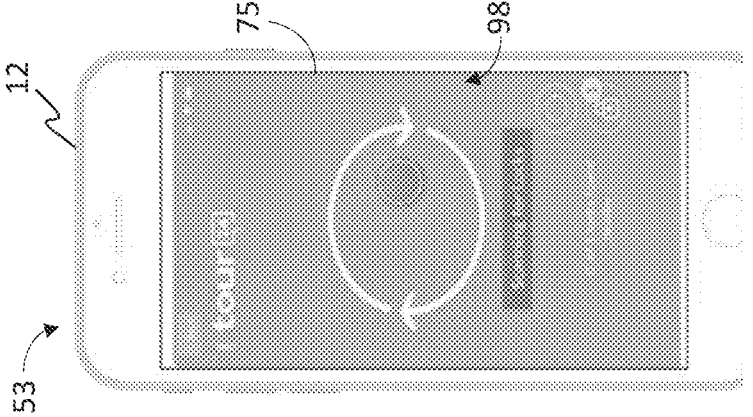

In one embodiment, the MURF includes a model unit having a smartlock device for controlling access thereto. The systems and methods for performing SGTs described herein are compatible with a wide array of such smartlock devices, which are readily available on the market from a large number of suppliers, and which utilize wired and/or wireless communications protocols for communicating with tour server and/or computing devices associated with the MURF owner and/or management. Such smartlock devices may include algorithmic locks, along with additional types of electro-mechanical locks having remote communication capabilities such as are known to persons having ordinary skill in the art. In the embodiment, the method for performing an SGT shown and described above with reference to FIG. 4 further includes receiving, by the tour server, a signal indicating that a location of the client device 110 in the MURF is within a predetermined range of the smartlock device (and, therefore, the model unit). In response to receiving the signal indicating that the location of the client device 110 in the MURF is within the predetermined range of the smartlock device, the tour server causes one or more model unit access windows (e.g., 53 and 54) to be displayed to a user of the client device 110 (e.g., via display 75 of smartphone 12), as shown in FIGS. 32 and 33. The one or more model unit access windows include a means for the user of the client device 110 to interact with the one or more model unit access windows to unlock a locked smartlock device present on a model unit entrance door and thereby gain access to the model unit.

As shown in FIG. 32, a first model unit access window 53 includes a status indicator graphic 98. In the illustrated example, in response to the client device 110 coming into proximity to the smartlock device, the tour server and/or the client device 110 causes a wireless communication connection (e.g., using Bluetooth, WiFi, and the like) to be established between the client device 110 and the smartlock device. In response to the wireless communication connection between the client device 110 and the smartlock device being established, the tour server causes a second model unit access window 54 to be displayed to the user of the client device, as shown in FIG. 33. The second model unit access window 54 includes lock graphics 99. In the illustrated example, lock graphics 99 includes the unit number of the model unit of the MURF and a lock status indicator, shown as unlocked in FIG. 33. In one example, the SGT guest of the MURF premises is allowed just one entry into the model unit using the functionality of the first 53 and second 54 model unit access windows, and the smart lock device automatically locks upon the model unit entry door being closed. In this manner, the MURF owner and/or management may discourage, if desired, the SGT guest from lingering in, and/or returning to, the model unit for undue amounts of time. In another example, model unit access windows 53 and 54 are configured to utilize a unique identifier for the user of the client device, such that a particular user unlocking the smartlock device does so in association with his or her identity. In this manner, the act of unlocking the model unit is tied to the respective user, and the MURF owner and/or operator may, via communication therewith by the tour server, for instance, learn when, and for how long, the SGT guest entered, and stayed in, the model unit, respectively.

Figures 34, 35, 36:
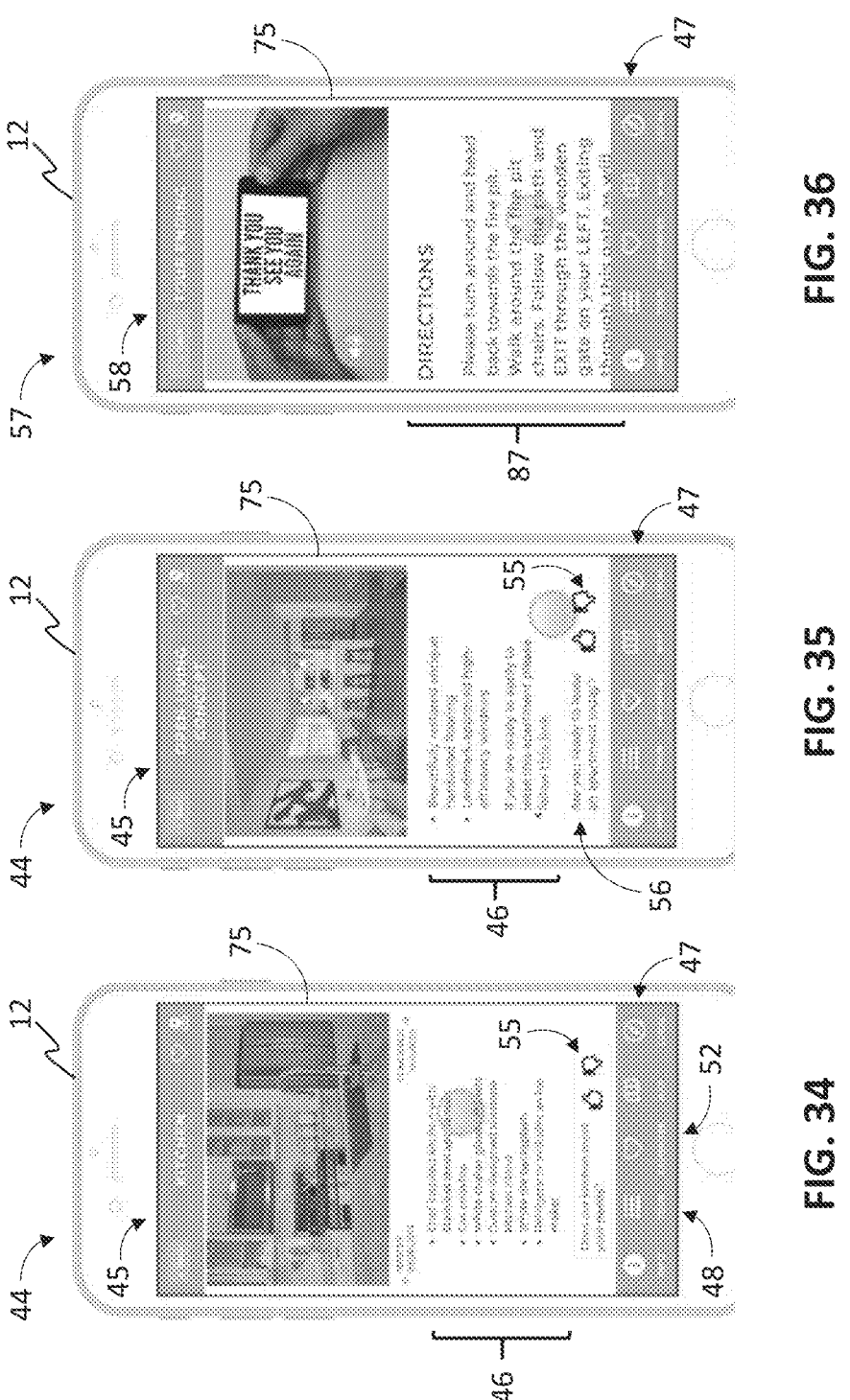

Additional features of the tour information windows 44 for respective locations and/or amenities of the MURF property are illustrated in FIGS. 34 and 35. In one embodiment, the method for performing the SGT shown and described above with reference to FIG. 4 further includes causing, by the tour server, a means for the user of the client device 110 to transmit feedback to the tour server (and/or to computing device(s) associated with the MURF owner and/or management) about at least one of: the model unit, the one or more amenities, and other locations in the MURF, to be displayed (e.g., via display 75 of smartphone 12) to the user in the one or more informational windows 44. For instance, as shown in FIG. 34, a question "does the kitchen meet your needs?" with thumbs up/thumbs down buttons 55 positioned adjacent to the question text enables the user of the client device 110 to transmit feedback about that aspect of the model unit. Similarly, in FIG. 35, the buttons 55 are provided to the right of a question regarding the readiness of the user of the client device 110 to "lease an apartment today." Using examples such as these, along with others that a person having ordinary skill in the art will readily recognize and appreciate, the step of receiving 414 the tour data thus may include receiving, by the tour device (and/or the MURF-associated computing device(s)), the feedback from the client device.

Additional text besides textual information 46 corresponding to the respective location being visited on the SGT present in the tour location information windows 44 may further include a link to an online leasing application for a unit (e.g., an apartment) of the MURF. In one embodiment, this link is caused, by the tour server, to be displayed to the user of the client device 110 in those tour information window(s) 44 associated with locations inside the model unit. In another embodiment, the tour server causes link the online leasing application to be displayed on tour location information window(s) 44 other than, or in addition to, those tour information window(s) 44 associated with locations inside the model unit.

Upon the client device 110 being carried by the user during the SGT exiting the model unit, or upon, or within a predetermined amount of time of, the expiration or end time for the SGT, the tour server causes an exit directions window 57 to be displayed to the user of the client device 110 (e.g., via display 75 of smartphone 12), as shown in FIG. 36. The exit directions window 57 includes a "tour ending" message 58 along with textual directions 87 for the SGT guest to leave the MURF property premises. In an example, the textual directions 87 will direct the user of the client device 110 to or past the leasing office of the MURF so that leasing staff, if available, may interact with the SGT guest to mutually beneficial ends.

In one embodiment, the MURF includes one or more geolocator beacons (GBs) positioned therein (e.g., on or in the interiors of doors, walls, and/or ceilings, and/or hidden in plant pots and/or picture frames) at or proximal to locations of at least one of: a model unit, one or more amenities, and other locations in the MURF. In the embodiment, the method for performing the SGT as described above with reference to FIG. 4 further includes receiving, by the tour server, a signal indicating that a location of the client device 110 in the MURF is within a predetermined range of a respective GB of the one or more GBs. In response to receiving the signal indicating that the location of the client device 110 in the MURF is within the predetermined range of the respective GB, the tour server causes the one or more informational windows 44 to be displayed to a user of the client device 110 (e.g., via display 12 of smartphone 12). The informational window(s) 44 include at least one of: text, images, and graphics, corresponding to, and containing information for, at least one of the: model unit, the one or more amenities, and other MURF locations, proximal the respective GB. The signal indicating that the location of the client device 110 in the MURF is within the predetermined range of the respective GB may be received by the tour server from at least one of: the client device, the respective GB, and a computing device associated with the MURF and in communication with the respective GB.

In one embodiment, the method for performing the SGT further includes receiving, by the tour server, a signal indicating that a location of the client device 110 in the MURF is at, or proximal to, at least one of: the model unit, the one or more amenities, and other MURF locations, of the MURF. In response to receiving the signal indicating that the location of the client device 110 in the MURF is at, or proximal to, the at least one of: the model unit, the one or more amenities, and the other MURF locations, the tour server causes the one or more informational windows 44 to be displayed to the user of the client device. The informational windows 44 include at least one of: text, images, and graphics, corresponding to, and containing information for, the at least one of the: model unit, the one or more amenities, and the other MURF locations. The signal indicating that the location of the client device 110 in the MURF is at, or proximal to, the at least one of: the model unit, the one or more amenities, and the other MURF locations, may be received by the tour server from at least one of: the client device, and computing device(s) associated with the MURF.

In one embodiment, the method for performing the SGT may further include determining, by the tour server, at least one of: a path taken through the MURF by the user of the client device 110 during the SGT; a sequence of the at least one of: the model unit, and the one or more amenities, visited in the MURF by the user of the client device 110 during the SGT; and an amount of time spent at each of the at least one of: the model unit, and the one or more amenities, visited in the MURF by the user of the client device 110 during the SGT. These data may be determined by the tour server based on a plurality of signals indicating that the location of the client device 110 in the MURF is within the predetermined range of the respective GB, and/or based on a plurality of signals indicating that the location of the client device 110 in the MURF is at, or proximal to, the at least one of: the model unit, the one or more amenities, and the other MURF locations.

For the signal indicating that the location of the client device 110 in the MURF is at, or proximal to, the model unit, the method for performing the SGT may further include causing, by the tour server, the aforementioned online leasing application link to be displayed to the user of the client device 110 (e.g., via display 75 of smartphone 12) on the one or more informational windows 44. In one embodiment, the signal indicating that the location of the client device 110 in the MURF is within a predetermined range of the smartlock device may be received by the tour server from at least one of: the client device, the smart lock device, the one or more GBs positioned proximal the model unit, and the MURF-associated computing device(s) that are in communication with at least one of: the smart lock device, and the one or more GBs.

Figure 37:
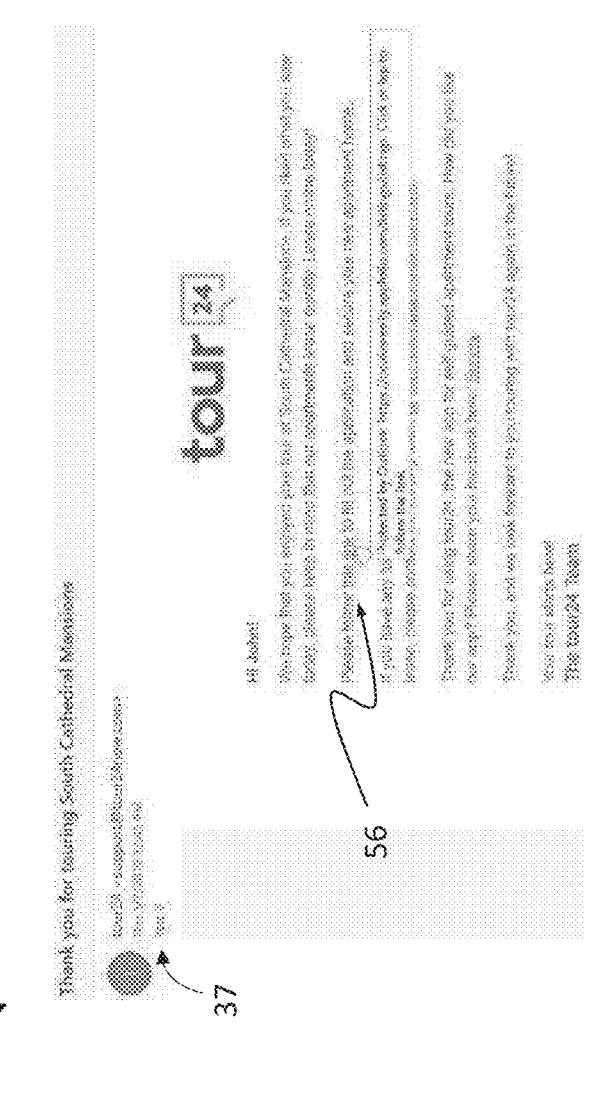
Figure 38:
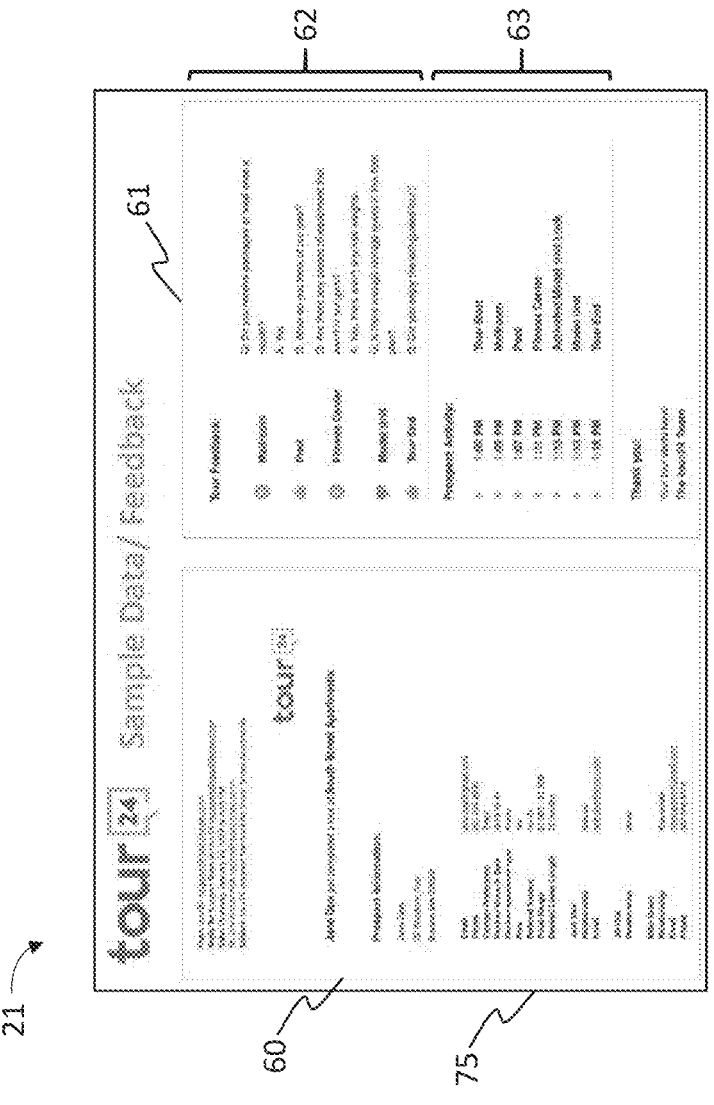
FIGS. 38-43 illustrate various features of a web portal which enable the owner and/or management of the multi-unit residential facility (MURF) to view, analyze, and otherwise manipulate data received from users of the client device for the self-guided tours scheduled and/or performed at the MURF.

In one embodiment of the method for performing an SGT shown and described above with reference to FIG. 4, the confirmation 59 sent 416 to the client device 110 user's email address 37 includes a link 56 to the online leasing application of the MURF, as shown in FIG. 37. A link to a user survey related to the smartphone 12 app used for performing the SGT as described may also be included in the sent 416 confirmation.

Figure 39:
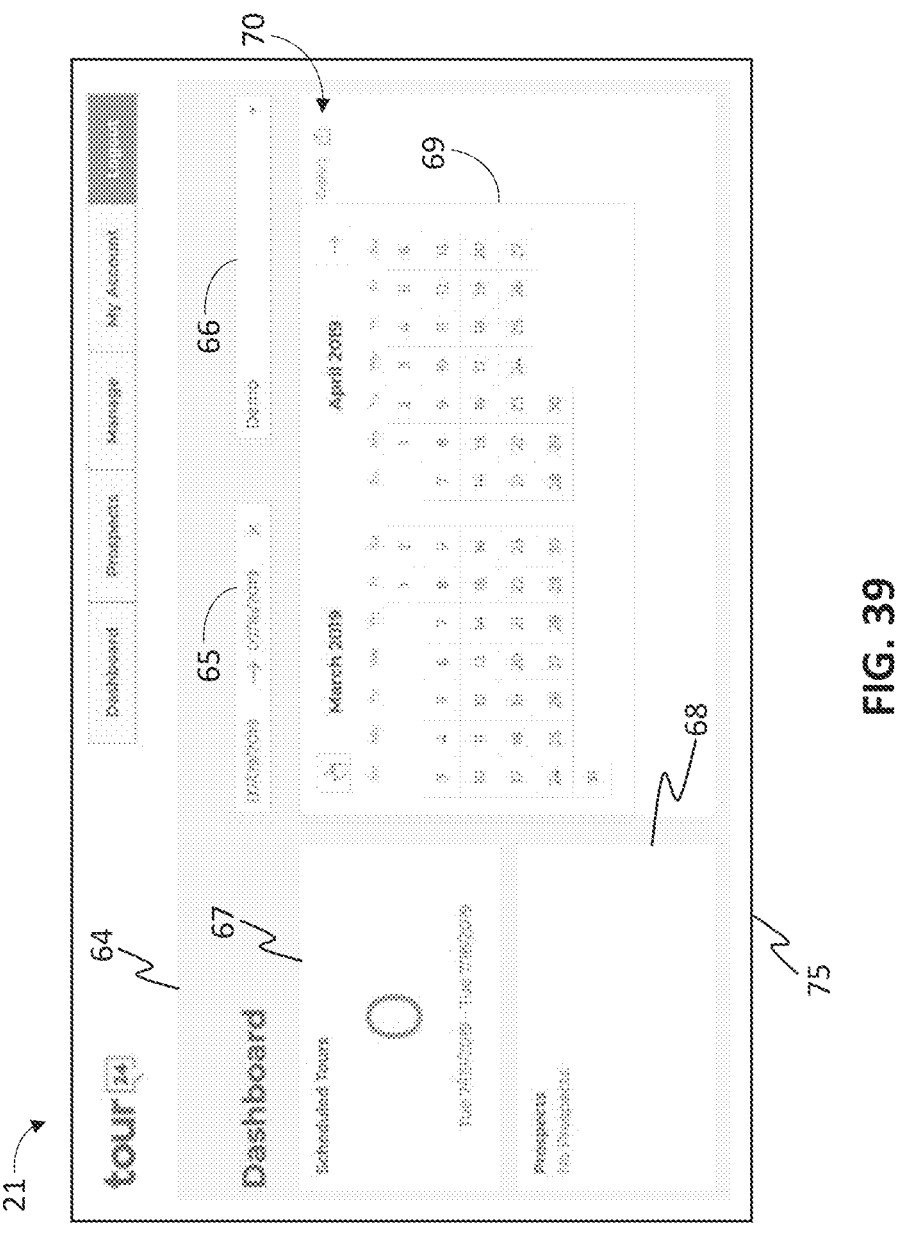

FIGS. 38-43 illustrate various features of the web portal 21 which enable the owner and/or management of the MURF to view, analyze, and otherwise manipulate data received from users of the client device 110 for the SGTs scheduled and/or performed at the MURF. As shown in FIG. 39, a dashboard 64 of the web portal 21 may include date range 65 and tour type 66 selection tools for selecting a date range for SGTs and types of SGTs, respectively. Upon selecting the date range and the SGT type, a first statistics window 67 on the dashboard 64 provides the number of SGTs scheduled in the selected date range, along with a prospect window 68 containing the information for client device 110 users (e.g., "prospects") who engaged in the SGTs during that date range. Additionally, or instead, of selecting the date range using the date range tool 65, single dates may be clicked on a calendar window 69 of the dashboard to obtain similar information for a particular single date to be displayed (e.g., on a display 75 of a MURF-associated computing device) in the first statistics 67 and prospect 68 windows. The dashboard 64 also includes an export tool 70 for downloading SGT-related information as an Excel or other suitable file type to facilitate other or additional data analysis by the owner and/or management of the MURF.

Figure 40:
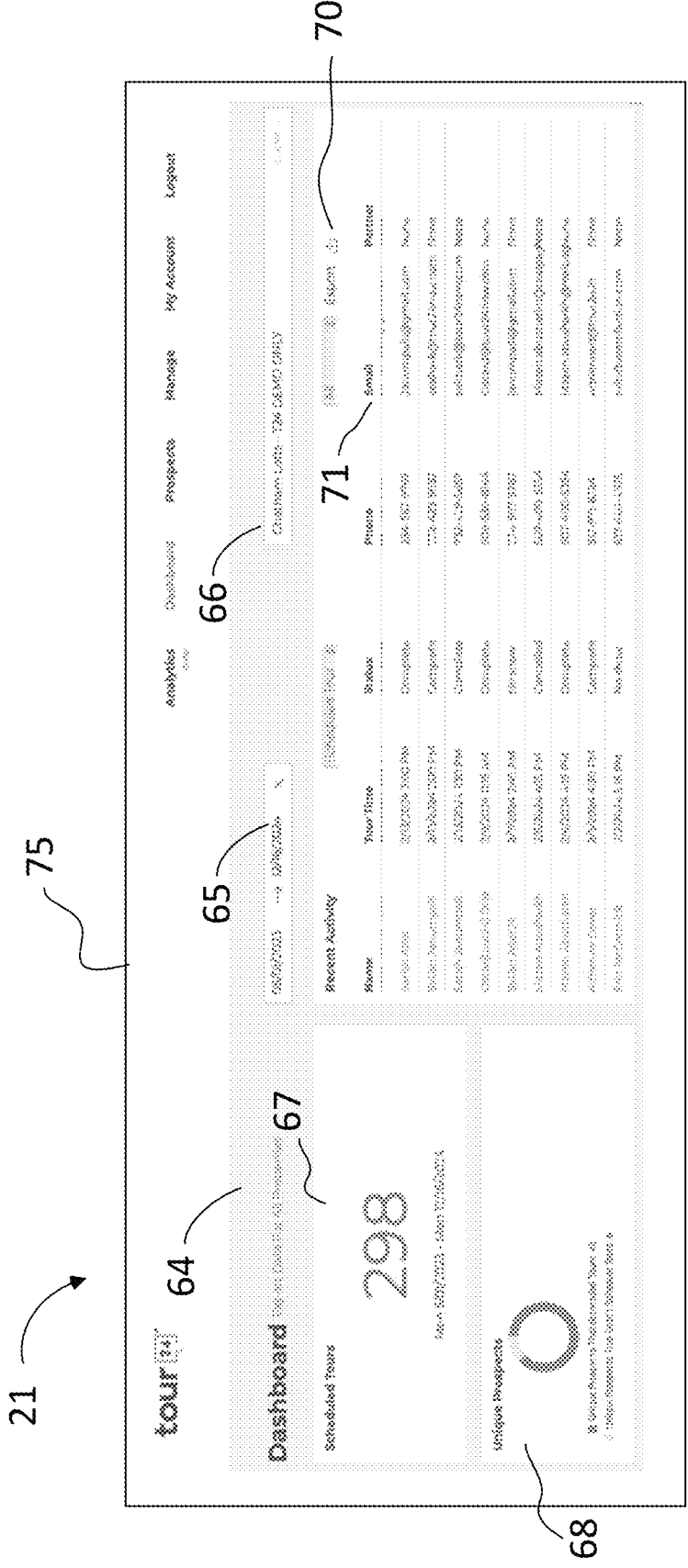
Figure 41:
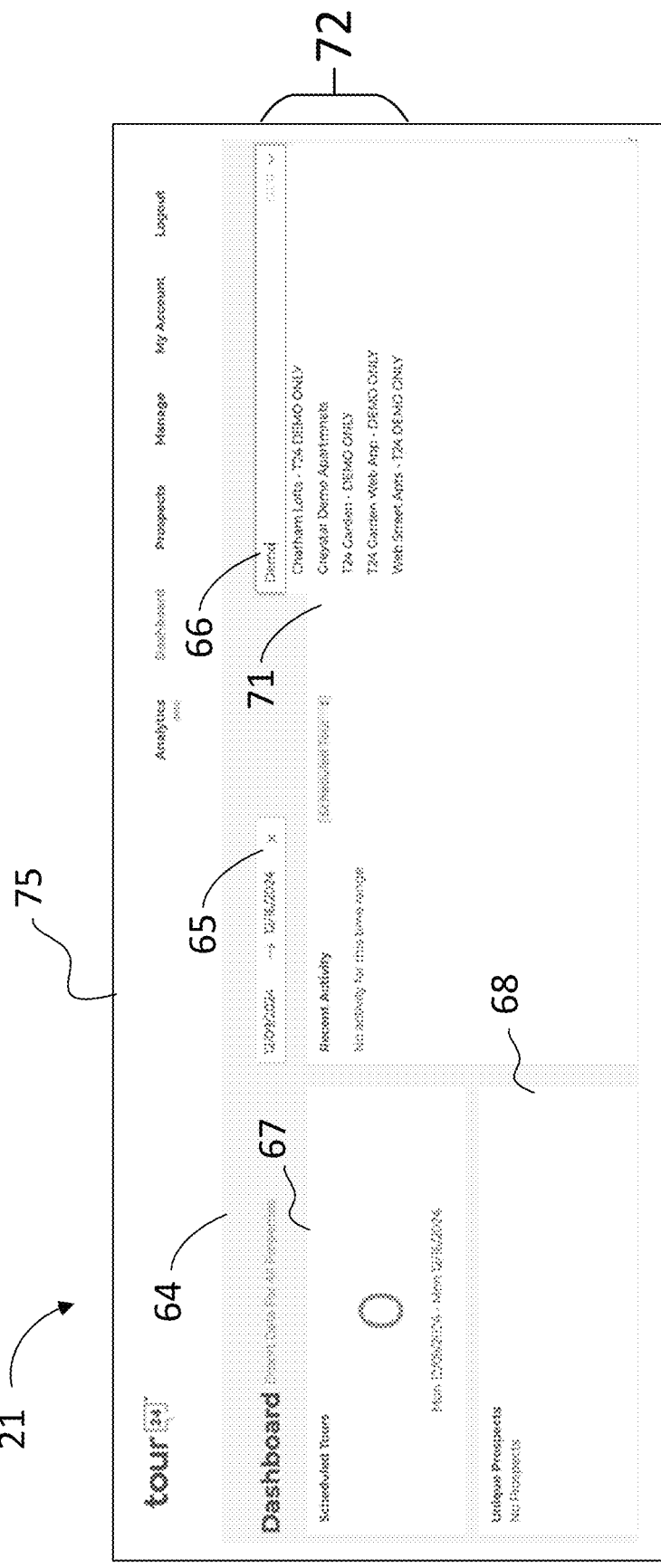
Figure 42:
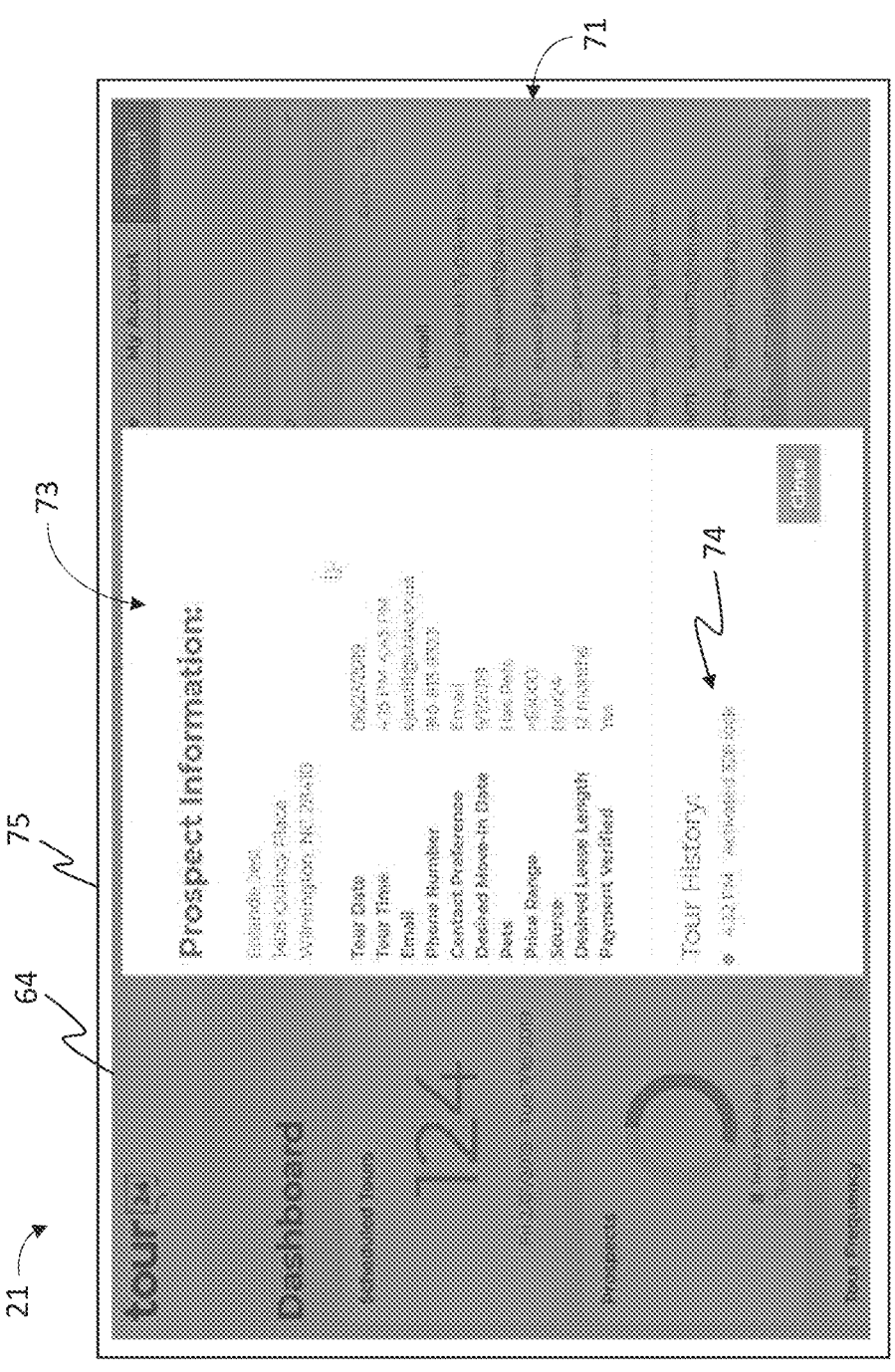

As shown in FIG. 40, by clicking on the export tool 70, a listing of the SGT-related information in the form of a table 71 replaces the calendar window 69 in the dashboard 64. In one embodiment, the SGT type tool 66 includes drop down menu functionality. As shown in FIG. 41, this drop down for SGT type tool 66 may include a listing 72 of commonly owned and/or commonly managed MURF properties. In this manner, by selecting a particular type from the drop down of this SGT type tool 66, statistics and/or other SGT-related information may be viewed and/or exported specifically for single MURF properties. As shown in FIG. 42, clicking and/or double clicking on individual row entries in table 71 causes the tour server to display a prospect pop-out window 73 over the web portal 21 on display 75. Window 73 includes details about the prospect such as contact information, SGT start and end times, contact preferences, desired move in date, pets, rent price range, referral source, desired lease length, and an indication, or flag, as to whether the prospect's ID and/or payment information have been validated and/or verified, respectively. Additionally, in the example illustrated in FIG. 42, tour history information 74 for the prospect is provided in window 73.

Figure 43:
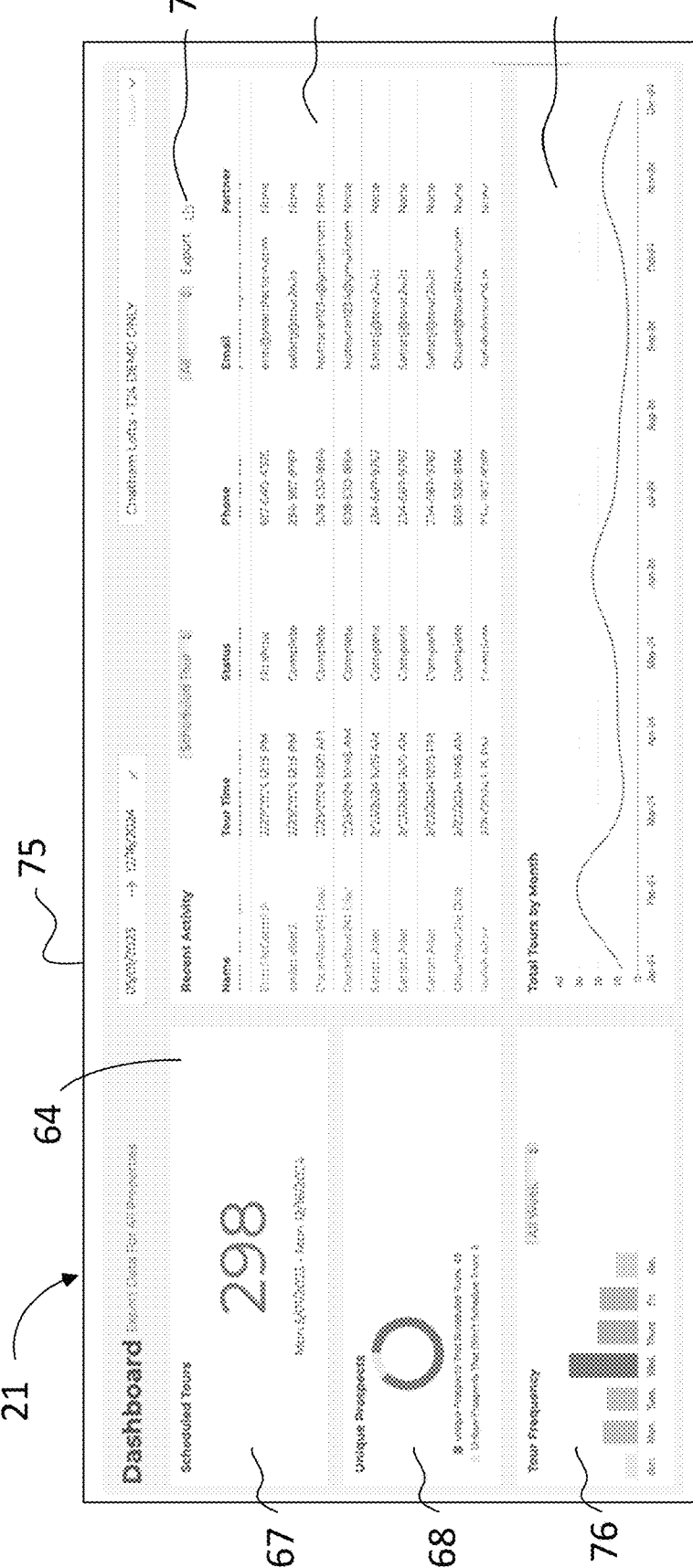

In one embodiment, graphics in the form of, for example, and without limitation, a tour frequency bar graph 76 and a tour occurrence plot 95 may be provided in web portal 21 dashboard 64, as shown in FIG. 43. Plot 95 provides a visual tool for the owner and/or management of the MURF to ascertain trends in SGT scheduling over the course of a specified period of time such as the previous 12 months. Graph 76 provides a visual tool for the owner and/or management of the MURF to ascertain SGT frequency for a particular day. Graph 76 may utilize average values for a day of a week (e.g., Saturday), where the average may be taken over a specified time period (e.g., the previous year or a portion thereof). In this manner, provision of metrics such as those described above with reference to FIGS. 38-43 may facilitate owners and/or management of MURFs to effectively staff and utilize the features of the systems and methods for scheduling and performing SGTs disclosed herein effectively to maximize the efficiency of their business operations, as well as create a convenient and user-friendly experience for prospective tenants.

Figure 44:
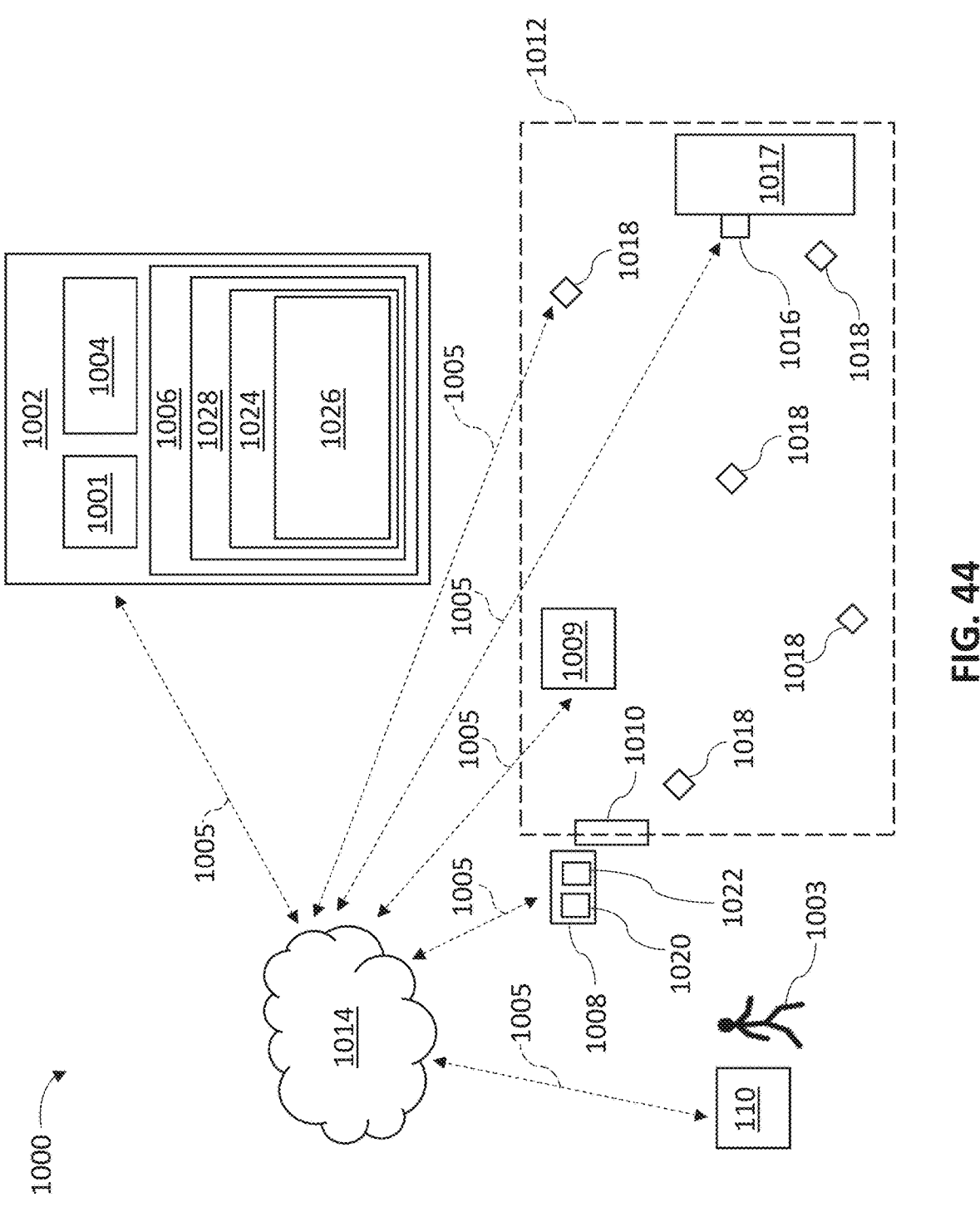
FIG. 44 illustrates a system for performing a self-guided tour according to an embodiment of the disclosure.

FIG. 44 illustrates a system 1000 for performing a self-guided tour according to an embodiment of the disclosure. The system 1000 may be utilized, at least in part, for performance of one or more of the above-described steps of the method for performing SGTs. The system includes a tour server 1002. The tour server 1002 includes one or more processors 1004 in communication with one or more memory devices 1006. A tour access control system 1008 is positioned at an entrance 1010 of the MURF 1012. The tour access control system 1008 is in communication with one or more of: the tour server 1002, and a computing device associated with the MURF 1009. Communication among and between the components of system 1000 shown in FIG. 44 may be accomplished using a network 1014 via wired and/or wireless communications equipment and protocols including, without limitation, using the Internet, LAN, and/or cellular networks. Tour server 1002 includes a transceiver 1001 (e.g., having data and/or control signal 1005 transmitting and receiving functionality) in communication with processor(s) 1004 for facilitating network 104 communication. The two-way dashed arrows in FIG. 44 denote direct or indirect connections for various lines or paths of data and/or control signal 1005 communications in system 1000, according to the embodiments disclosed herein. The tour server 1002 implements, performs, and/or otherwise facilitates: sending 404 property access information to a client device; receiving 406 a trigger from the tour access control system indicating that a user 1003 of the client device 110 has entered the MURF; providing 412 tour directions for the MURF to the client device 110; receiving 414 tour data for the SGT; and sending 416 a confirmation to the client device 110 after the SGT is completed. The system 1000 may further include the above-described smart lock device 1016 (e.g., for gaining access to the model unit 1017), GBs 1018, and the code entry 1020 and reader 1022 devices of the property access system (e.g., tour access control system 1008).

In some embodiments of the disclosure, the processor(s) 1004 of the tour server 1002 may utilize program instructions stored as software 1024 in one or more modules 1026 of memory 1006, where memory 1006 may be in the form of non-transitory computer-readable medium 1028. Processor(s) 1004 may take the form of CPUs, GPUs, microcontrollers, application-specific integrated circuits, and the like. In such embodiments, processor(s) 1004 of the tour server 1002 execute the program instructions to perform any or all of the disclosed methods, including the embodiments of the disclosed method for scheduling the SGT and/or the disclosed method for performing the SGT.

Using the disclosed systems and methods for scheduling and performing SGTs provides users 1003 and MURF 1012 owners and/or managers a number of beneficial technical effects and realizes various advantages as compared to known systems and methods. Such benefits include, without limitation, enabling more efficient use of personnel, computing, and time resources for both users 1003 and MURF 1012 owners and/or managers, providing additional channels for marketing MURFs to prospective tenants, giving SGT-associated information in a convenient format for analysis and trending, and ensuring that prospects who engage in the above-described SGTs are vetted, verified, and validated for identification purposes. These benefits, and others to be recognized and appreciated by persons having ordinary skill in the art, are not achieved merely through the use of routine and/or conventional computing devices. Rather, the disclosed systems and methods provide such advantageous technical effects by way of efficient data processing and provision of a user-friendly experience to take advantage of, and effectively address, extant economic problems in the field of multi-unit residential facility touring for prospective tenants.

Utilizing the disclosed systems and methods for scheduling and/or performing SGTs of MURFs thereby results in a reduction in the required number of MURF leasing staff for scheduling and conducting tours of MURF premises, gives prospective tenant users of the disclosed smartphone app (and/or other software user interface for users to employ on any other type of client device) a speedy and easily operated interface for scheduling and performing SGTs at their own convenient time, as well as enabling more efficient business operations at the MURF, including marketing and customer relationship management (CRM). Furthermore, the disclosed systems and methods for scheduling and performing SGTs enable tour-associated business and computing processes to be performed with greater efficaciousness and improved utilization efficiency of computing, memory, network, electric power, and/or human personnel resources as compared to known processes. These and other substantial and numerous technical benefits and advantageous effects appreciable to persons of ordinary skill in the art are especially evident as compared to known systems and methods in MURF application environments involving high volume and high tempo interactions with prospective tenants.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for a self-guided tour (SGT) of a multi-unit residential facility (MURF), comprising:

a tour server configured to:

schedule the SGT of a unit of the MURF;

provide, to a client device, an access screen based on scheduling the SGT, wherein the access screen comprises an indicia for unlocking a smartlock device associated with the MURF;

receive, from the client device, user input indicating selection of the indicia for unlocking the smartlock device associated with the MURF;

unlock the smartlock device based on the received user input;

subsequent to unlocking the smartlock device, determine that a user associated with the client device has completed the scheduled SGT of the unit;

based on determining that the user has completed the scheduled SGT, generate one or more follow-up messages related to the SGT, wherein the one or more follow-up messages comprises a link to a leasing application for the unit of the MURF; and provide, to the client device, the one or more follow-up messages; and the client device configured to:

receive, from the tour server, the access screen based on the scheduled SGT of the unit, wherein the access screen comprises the indicia for unlocking the smartlock device to access the MURF;

provide, to the tour server, the user input indicating selection of the indicia for unlocking the smartlock device associated with the MURF;

receive, from the tour server, the one or more follow-up messages; and obtain user input from the user that responds to the one or more follow-up messages.

2. The system of claim 1, wherein the one or more follow-up messages guide the user to apply for the unit.

3. The system of claim 1, wherein the tour server is further configured to:

receive the user input from the client device; and provide the user input to a management system associated with the MURF.

4. The system of claim 1, wherein the one or more follow-up messages comprise questions asking the user whether the user has queries related to the unit of the MURF.

5. The system of claim 1, wherein:

the tour server is further configured to:

subsequent to detecting that the access screen is used to unlock the smartlock device, receive a floor plan of the unit from a management system; and provide, to the client device, the floor plan of the unit; and the client device further configured to:

receive the floor plan of the unit from the tour server.

6. A tour server comprising:

one or more processors; and a non-transitory computer-readable medium having processor-executable instructions stored thereon for a self-guided tour (SGT) of a multi-unit residential facility (MURF), wherein the processor-executable instructions, when executed by the one or more processors, facilitate:

receiving, from a client device, a request to schedule the SGT of a unit of the MURF, wherein the request is initiated based on the client device scanning a quick-response (QR) code;

based on the request, scheduling the SGT of the unit of the MURF;

providing, to the client device, an access screen based on scheduling the SGT, wherein the access screen comprises an indicia for unlocking a smartlock device associated with the MURF;

based on user input indicating selection of the indicia for unlocking the smartlock device associated with the MURF, unlocking the smartlock device;

subsequent to unlocking the smartlock device, determining that a user associated with the client device has completed the scheduled SGT of the unit;

based on determining that the user associated with the client device has completed the scheduled SGT of the unit, generating one or more follow-up messages related to the SGT of the unit, wherein the one or more follow-up messages comprises a link to a leasing application for the unit of the MURF; and providing, to the client device, the one or more follow-up messages.

7. The tour server of claim 6, wherein the one or more follow-up messages comprise feedback questions related to the unit of the MURF.

8. The tour server of claim 6, wherein the processor-executable instructions further facilitate:

receiving, from the client device, user input that responds to the one or more follow-up messages; and providing the user input to a management system associated with the MURF.

9. The tour server of claim 6, wherein the one or more follow-up messages comprise questions asking the user whether the user has queries related to the unit of the MURF.

10. The tour server of claim 6, wherein scheduling the SGT of the unit comprises:

receiving payment information associated with the user;

providing the payment information to a payment provider to determine whether the payment information is valid; and based on receiving an indication indicating the payment information is valid from the payment provider, scheduling the SGT of the unit.

11. The tour server of claim 6, wherein scheduling the SGT of the unit comprises:

receiving identification (ID) information for the user;

providing the ID information to an ID verification provider to determine whether the ID information is valid; and scheduling the SGT of the unit based on receiving an indication indicating the ID information is valid from the ID verification provider.

12. The tour server of claim 6, wherein providing the access screen comprises providing an access code to the client device at a set time interval prior to the scheduled SGT of the unit.

13. The tour server of claim 6, wherein the processor-executable instructions further facilitate:

subsequent to the user using the access screen to unlock the smartlock device to access the unit, receiving a floor plan of the unit from a management system; and providing, to the client device, the floor plan of the unit.

14. The tour server of claim 6, wherein the one or more follow-up messages guide the user to apply for the unit of the MURF.

15. The tour server of claim 6, wherein scheduling the SGT of the unit comprises:

providing, to the client device, a scheduling interface that includes a plurality of available time slots associated with the unit;

receiving, from the client device, a selection of a time slot of the plurality of available time slots for scheduling the SGT of the unit; and updating, by the tour server, the plurality of available time slots associated with the unit based on the selected time slot.

16. The tour server of claim 15, wherein providing the scheduling interface including the plurality of available time slots associated with the unit comprises:

providing, to a manager device, an availability input interface associated with the unit, wherein the availability input interface is configured to receive availability information associated with the unit;

receiving the availability information associated with the unit that is received by the availability input interface; and determining, based on the availability information, the plurality of available time slots associated with the unit.

17. The tour server of claim 16, wherein the processor-executable instructions further facilitate:

receiving an update to the availability information associated with the unit that is provided to the availability input interface, wherein the update to the availability information comprises an indication that the unit is unavailable for SGTs for a subset of the plurality of available time slots.

18. A non-transitory computer-readable medium having processor-executable instructions stored thereon for a self-guided tour (SGT) of a multi-unit residential facility (MURF), wherein the processor-executable instructions, when executed, facilitate:

receiving, from a client device, a request to schedule the SGT of a unit of the MURF, wherein the request is initiated based on the client device scanning a quick-response (QR) code;

based on the request, scheduling the SGT of the unit of the MURF;

providing, to the client device, an access screen based on scheduling the SGT, wherein the access screen comprises an indicia for unlocking a smartlock device associated with the MURF;

based on user input indicating selection of the indicia for unlocking the smartlock device associated with the MURF, unlocking the smartlock device;

subsequent to the smartlock device, determining that a user associated with the client device has completed the scheduled SGT of the unit;

based on determining that the user associated with the client device has completed the scheduled SGT of the unit, generating one or more follow-up messages related to the SGT of the unit, wherein the one or more follow-up messages comprises a link to a leasing application for the unit of the MURF; and providing, to the client device, the one or more follow-up messages.

19. The non-transitory computer-readable medium of claim 18, wherein scheduling the SGT of the unit comprises:

receiving payment information associated with the user;

providing the payment information to a payment provider to determine whether the payment information is valid; and based on receiving an indication indicating the payment information is valid from the payment provider, scheduling the SGT of the unit.

20. The non-transitory computer-readable medium of claim 18, wherein scheduling the SGT of the unit comprises:

receiving identification (ID) information for the user;

providing the ID information to an ID verification provider to determine whether the ID information is valid; and scheduling the SGT of the unit based on receiving an indication indicating the ID information is valid from the ID verification provider.

* * * * *